(12) United States Patent
Gottlieb

(10) Patent No.: US 8,779,265 B1
(45) Date of Patent: Jul. 15, 2014

(54) NETWORKS OF PORTABLE ELECTRONIC DEVICES THAT COLLECTIVELY GENERATE SOUND

(75) Inventor: Steven M. Gottlieb, New York, NY (US)

(73) Assignee: Shindig, Inc., New York, NY (US)

( * ) Notice: Subject to any disclaimer, the term of this patent is extended or adjusted under 35 U.S.C. 154(b) by 654 days.

(21) Appl. No.: 12/767,233

(22) Filed: Apr. 26, 2010

Related U.S. Application Data

(60) Provisional application No. 61/172,558, filed on Apr. 24, 2009, provisional application No. 61/245,971, filed on Sep. 25, 2009.

(51) Int. Cl.
*G10H 1/00* (2006.01)

(52) U.S. Cl.
USPC .......... 84/600; 84/615; 84/625; 84/645; 84/653; 84/660

(58) Field of Classification Search
None
See application file for complete search history.

(56) References Cited

U.S. PATENT DOCUMENTS

| | | | |
|---|---|---|---|
| 7,012,185 B2 * | 3/2006 | Holm et al. ................ | 84/645 |
| 7,091,926 B2 | 8/2006 | Kulas | |
| 7,164,906 B2 | 1/2007 | Herberger et al. | |
| 7,297,858 B2 * | 11/2007 | Paepcke ..................... | 84/609 |
| 7,453,418 B2 * | 11/2008 | Palmquist ................... | 345/1.1 |
| 7,483,080 B2 | 1/2009 | Arora et al. | |
| 7,489,323 B2 | 2/2009 | Yang et al. | |
| RE42,565 E * | 7/2011 | Paepcke ..................... | 84/609 |
| 8,044,289 B2 * | 10/2011 | Toledano et al. ............ | 84/600 |
| 2003/0024375 A1 * | 2/2003 | Sitrick ..................... | 84/477 R |
| 2003/0121401 A1 * | 7/2003 | Ito ........................... | 84/625 |
| 2003/0150317 A1 * | 8/2003 | Hamilton ................... | 84/477 R |
| 2004/0154460 A1 * | 8/2004 | Virolainen et al. ........... | 84/645 |
| 2005/0120865 A1 * | 6/2005 | Tada ......................... | 84/600 |
| 2006/0179160 A1 | 8/2006 | Uehara et al. | |
| 2007/0065794 A1 * | 3/2007 | Mangum ................... | 434/307 A |
| 2007/0293250 A1 * | 12/2007 | Kim ......................... | 455/466 |
| 2008/0045140 A1 | 2/2008 | Korhonen | |
| 2008/0139229 A1 | 6/2008 | Bailey et al. | |
| 2008/0216125 A1 | 9/2008 | Li et al. | |
| 2009/0168088 A1 | 7/2009 | Rosenblatt | |
| 2009/0213032 A1 | 8/2009 | Newport et al. | |
| 2009/0272251 A1 * | 11/2009 | Georges et al. ............. | 84/609 |
| 2010/0033402 A1 | 2/2010 | Yoshida et al. | |
| 2010/0041330 A1 * | 2/2010 | Elg .......................... | 455/3.06 |

FOREIGN PATENT DOCUMENTS

| | | |
|---|---|---|
| GB | 2427049 A | 12/2006 |
| JP | 2001356764 A | 12/2001 |
| WO | 2007135776 A1 | 11/2007 |

OTHER PUBLICATIONS

Roger LeLievre, "iPhone concert by U-M students will mix technology, creativity" annarbor.com, Dec. 4, 2009, p. 1-2, http://www.annarbor.com/entertainment/iphone-concert-by-u-m-students-will-mix-technology-creativity/.

* cited by examiner

*Primary Examiner* — Marlon Fletcher
(74) *Attorney, Agent, or Firm* — Kramer Levin Naftalis & Frankel LLP

(57) ABSTRACT

Systems and methods for collectively generating sound are provided. A sound composition can include multiple component pieces and those component pieces can be divided amongst devices so that the devices can collectively generate the sound composition. For example, each component piece may be assigned to a different device and the each device may provide its assigned component pieces in a synchronized manner so that the overall sound composition is collectively generated. By generating a sound composition in this manner, the network may create new and exciting spatial effects.

14 Claims, 17 Drawing Sheets

NETWORKS OF PORTABLE ELECTRONIC DEVICES THAT COLLECTIVELY GENERATE SOUND

CROSS-REFERENCE TO RELATED APPLICATION

This application claims the benefit of U.S. Provisional Application No. 61/172,558, filed Apr. 24, 2009, the disclosure of which is incorporated by reference herein in its entirety. This application further claims the benefit of U.S. Provisional Application No. 61/245,971, filed Sep. 25, 2009, the disclosure of which is also incorporated by reference herein in its entirety.

BACKGROUND OF THE INVENTION

Some traditional portable electronic devices allow users to generate sounds (e.g., software that allows a user to play a basic synthesizer on his phone), but such devices include no functionality for coordinating sound generation across multiple devices and users. For example, a traditional portable electronic device may allow a user to play a musical piece on her device, but the device will not coordinate her music with any other devices or their users. Some performers have applied manual coordination techniques (e.g., a human conductor standing in front of all of the performers), but these techniques fail to exploit any of the added functionality provided by an electronic device as opposed to a traditional musical instrument.

SUMMARY OF THE INVENTION

Systems and methods for collectively generating sound are provided. A sound composition, such as a musical composition or a sound effect, can include multiple component pieces and those component pieces can be divided amongst devices so that the devices can collectively generate the sound composition. For example, each component piece may be assigned to a different device and each device may provide its assigned component pieces in a synchronized manner so that the overall sound composition is collectively generated. By generating a sound composition in this manner, the network may create new and exciting spatial effects.

In some embodiments, each component piece may provide a blend of its assigned component piece and the overall sound composition. For example, a device may blend a component piece with the sound composition so that the component piece will have the proper context. In some embodiments, each component piece may provide a blend of a featured instrument track (e.g., an assigned component piece) and the musical bed (e.g., the overall sound composition) so that the devices can collectively generate a musical composition. Providing a blend of an assigned component piece and the overall sound composition may be especially useful in a more distributed network where a listener may not be able to hear the output of all the devices at the same time. Such a blend can be generated based on any number of factors or a combination thereof. For example, the blend may be generated based at least partially on a characteristic of the network, such as, for example, the number of devices collectively generating sound or the proximity of the devices collectively generating sound.

In some embodiments, devices may be grouped based at least partially on their location and then a component piece may be assigned to each group. For example, in a network with many devices, the devices may be grouped so that one cluster provides a first component piece and another cluster provides a second component piece and so forth. Such embodiments may be employed in, for example, networks that include more devices than component pieces.

In some embodiments, a component piece may be sequentially assigned to two or more devices to create the illusion the sound composition moving. For example, a component piece may be assigned to one device and then reassigned to another device to create the illusion that the subject associated with the content is moving.

In some embodiments, a network of devices may include a beacon device, and one or more of the sound components may be assigned to devices based at least partially on the location of those devices relative to the beacon device. Accordingly, the system may provide effects such as sound coalescing or pooling around the beacon device.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

A network of portable electronic devices may collectively generate sound. In accordance with the disclosure, various portable electronic devices can be used to form a network that can collectively generate sound. For example, communications devices (e.g., cellular telephones or "smartphones") can be used to collectively generate sound. In another example, portable gaming devices (e.g., PlayStation Portable™ or Nintendo DS™) can be used to collectively generate sound. While the two previous examples were merely illustrative, any portable electronic device that can generate audio (e.g., through integrated speakers or through headphones or speakers coupled with the device) and form or join a network of other devices can be used to collectively generate sound.

Portable electronic devices can form networks to collectively generate sound. Such networks can be based on any suitable network protocol or architecture. For example, portable electronic devices can form networks based on Wi-Fi (e.g., a 802.11 protocol), Bluetooth®, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network or protocol), infrared, TCP/IP (e.g., any of the protocols used in each of the TCP/IP layers), HTTP, BitTorrent, FTP, RTP, RTSP, SSH, Voice over IP (VOIP), any other communications protocol, or any combination thereof. In some embodiments, networks used to collectively generate sound can have a bus network architecture.

Figure 1:
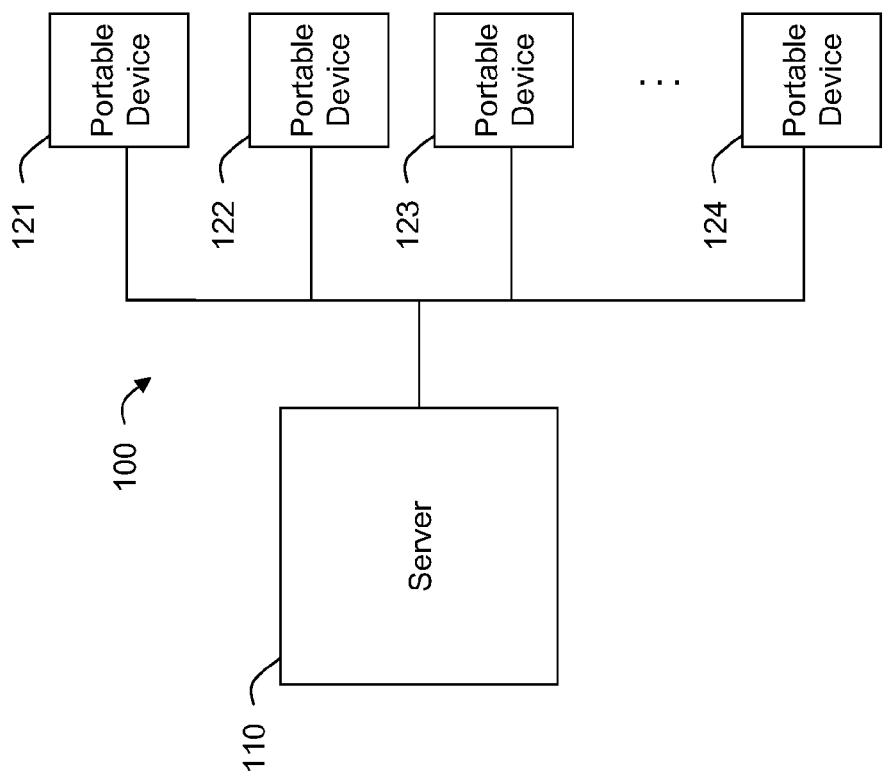
FIG. 1 is a schematic view of an illustrative system based on a hub network in accordance with one embodiment of the invention.

FIG. 1 includes system 100 for collectively generating sound. System 100 may include a network of portable electronic devices based on a bus network architecture. System 100 may include at least one server 110. Server 110 can be any suitable server for facilitating a network between two or more devices. For example, server 110 may include several interconnected computers running software to control network communications.

System 100 may include several portable devices 121-124. Server 110 may be coupled with devices 121-124 through any suitable network. For example, server 110 may be coupled with devices 121-124 through Wi-Fi (e.g., a 802.11 protocol), Bluetooth®, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network or protocol), infrared, TCP/IP (e.g., any of the protocols used in each of the TCP/IP layers), HTTP, BitTorrent, FTP, RTP, RTSP, SSH, Voice over IP (VOIP), any other communications protocol, or any combination thereof.

Each of devices 121-124 may include a communications device that allows a user to communicate with the users of other devices. In some embodiments, each device may correspond to a single user. For example, device 121 may correspond to a first user and device 122 may correspond to a second user. Server 110 may control communications between two or more of the devices. For example, server 110 may control one-to-one communications between device 121 and device 122 and/or multi-party communications between device 121 and devices 122-124. Each device may provide outputs to a user and receive inputs from the user when facilitating communications. For example, a device may include one or more output interfaces (e.g., display screen or audio output) for providing communication outputs to a user and one or more input interfaces (e.g., a controller, joystick, keyboard, or mouse) for receiving communication inputs from a user.

While only one server and four portable devices (e.g., devices 121-124) are shown in FIG. 1, it is understood that any number of servers and portable devices can be provided in a bus network that collectively generates sound. A more detailed description of communications systems operating on bus networks can be found in Provisional Application No. 61/117,477, which has been incorporated by reference.

Figure 2A:
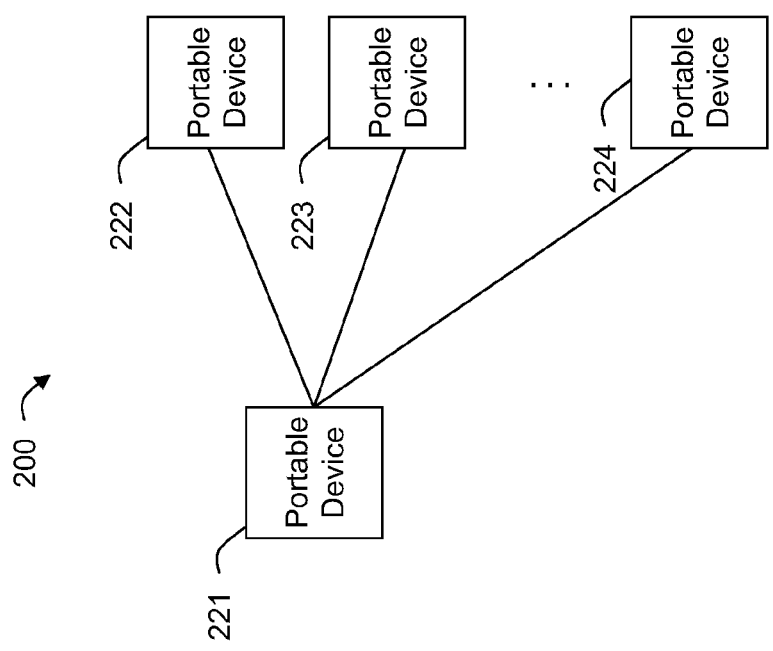
FIGS. 2A and 2B are schematic views of illustrative systems based on a tree network in accordance with one embodiment of the invention.
Figure 2B:
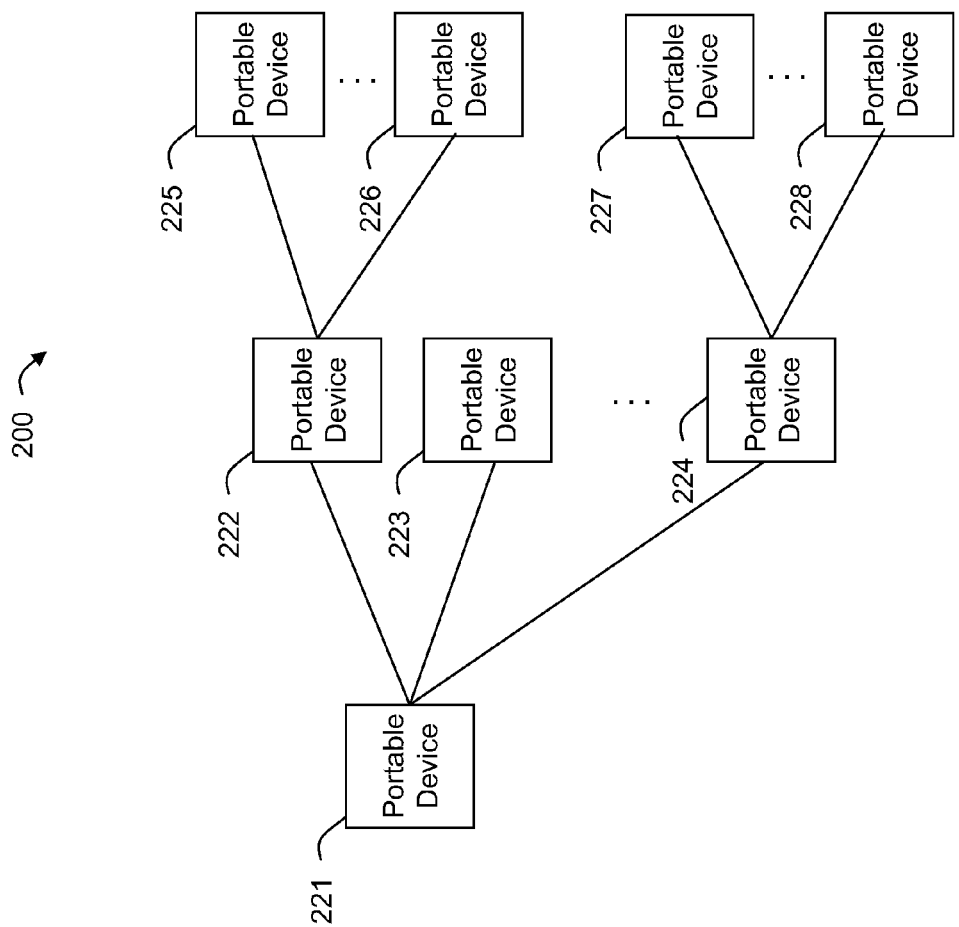

In some embodiments, networks used to collectively generate sound can have a tree network architecture. FIGS. 2A and 2B include system 200 for collectively generating sound. System 200 may include a network of portable electronic devices based on a tree network architecture. System 200 may include several portable electronic devices 221-224 similar to devices 121-124. Devices 221-224 may include output interfaces (e.g., display screen or audio output) and input interfaces (e.g., a controller, joystick, keyboard, or mouse) similar to devices 121-124.

One or more devices (e.g., device 221) may function as a central device in the network (e.g., a root node). A central device can then facilitate coordination by communicating with lower-level devices (e.g., devices 222-224). For example, a central device can perform some functions commonly handled by servers in hub networks while still serving as a portable electronic device. In some embodiments, a central device can relay communications between lower-level devices (e.g., between devices 222-224). For example, system 200 may be a network of devices based on a Bluetooth® protocol, and device 221 may be a master device (e.g., a central device or a root node) while devices 222-224 may be slave devices (e.g., lower-level devices).

FIG. 2B includes an expanded representation of system 200 in which the tree network extends beyond two levels. In FIG. 2B, portable devices 222 and 224 have become central devices for other levels of the tree network (e.g., portable device 222 is a central device for portable devices 225 and 226 while portable device 224 is a central device for portable devices 227 and 228). Accordingly, the network of devices can extend beyond the range of a single communications link and may also include more devices than a single level of network can accommodate. In the example of a network based on a Bluetooth® protocol, device 222 can act as a slave device with respect to device 221 while also acting as a master device with respect to devices 225 and 226. Continuing the example, device 222 may relay data from device 221 to devices 225 and 226 or vice-versa using this network architecture.

While only eight portable devices (e.g., devices 221-122) on three layers are shown in FIG. 2B, it is understood that any number of portable devices and layers can be provided in a tree network that collectively generates sound.

In accordance with the present disclosure, portable electronic devices can collectively generate sound. For example, a network of portable electronic devices may collectively generate sound in a coordinated manner. In some embodiments, each portable device in a network may generate a specific sound, and the network of devices may collectively generate a sound cumulative of the sound generated by each individual device. For example, each portable device may generate a piece (e.g., violin piece or cello piece) of a musical composition so that the network of devices collectively generates the musical composition.

Figure 3:
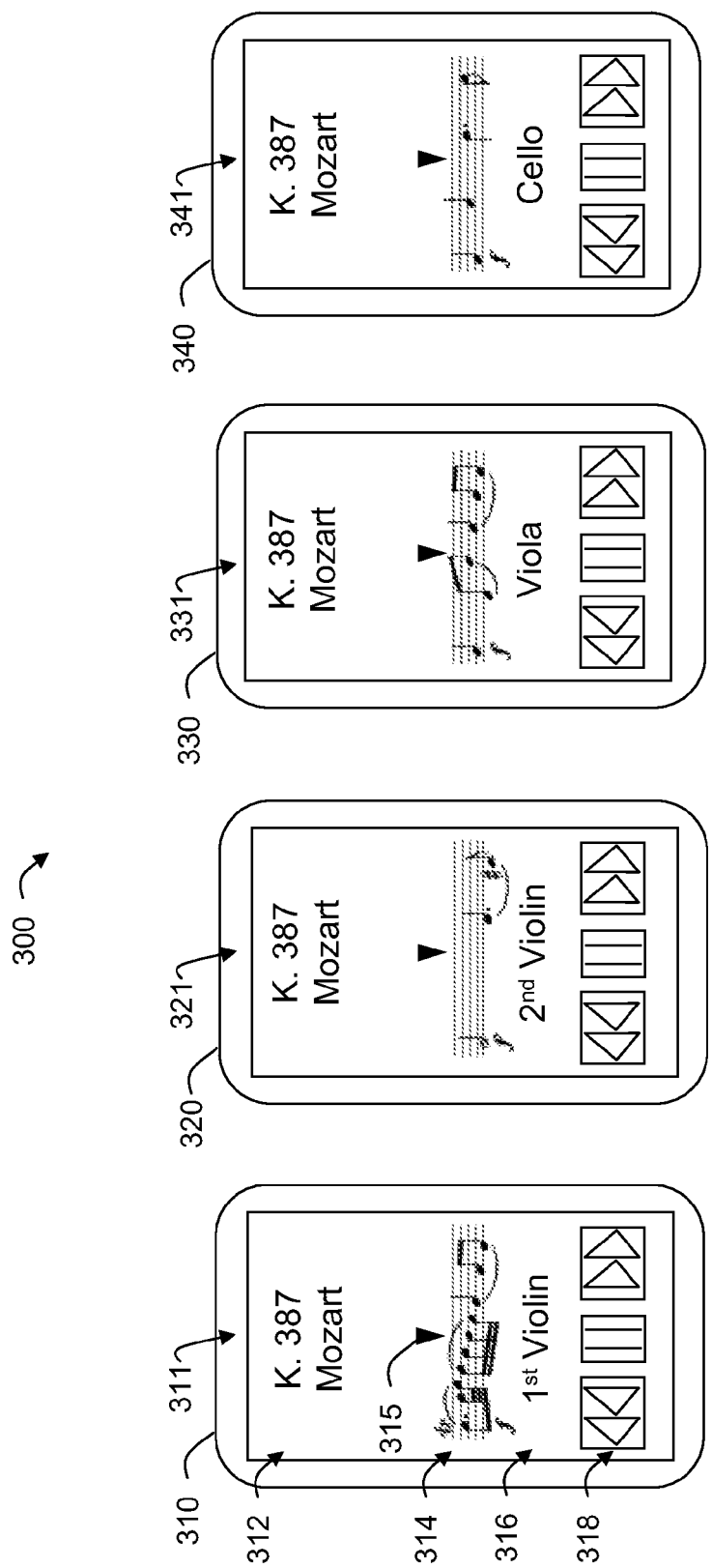
FIG. 3 is a schematic view of an illustrative system for delivering music in accordance with one embodiment of the invention.

FIG. 3 includes system 300 for collectively generating sound in accordance with one embodiment of the invention. System 300 can include two or more portable devices. For example, system 300 can include portable devices 310, 320, 330, and 340 (see, e.g., portable devices 121-124 or portable devices 221-228). Each portable device in system 300 can generate sound (e.g., through an integrated speaker, an external speaker coupled with the device, or headphones coupled with the device). Each of the devices in system 300 can be part of a network. For example, system 300 can include a server (not shown) and devices 310, 320, 330 and 340 can be part of a bus network that includes the server (see, e.g., system 100). In another example, devices 310, 320, 330 and 340 can form a tree network without requiring a dedicated server (see, e.g., system 200). Any suitable network protocol or architecture can be used to form a network that includes the devices of system 300.

Each portable device in system 300 can generate sounds that may be a piece of a musical composition. For example, at least two of the devices may generate different sounds that collectively form a musical composition. In FIG. 3, each of devices 310, 320, 330 and 340 may be generating a different piece of a larger musical composition. For example, device 310 can play the first violin piece of Mozart's K. 387 composition while device 320 can play the second violin piece, device 330 can play the viola piece, and device 340 can play the cello piece. Accordingly, devices in system 300 can collectively play Mozart's K. 387 composition. By playing each piece through a different portable device, system 300 may more accurately recreate a live performance of the composition. For example, each of portable devices 310, 320, 330, and 340 may be spaced apart to recreate the audio effect of each piece coming from a different instrument.

Some of the portable devices in system 300 can provide outputs representing the music that the system is providing. In some embodiments, devices 310, 320, 330, and 340 may each include a display screen (e.g., screens 311, 321, 331, and 341) and each device may use its display screen to provide information about any music that the device is playing. For example, screen 311 may include composition indicator 312, musical notation 314, position indicator 315, piece indicator 316, or any other suitable indicators related to music being played. Composition indicator 312 may represent the musical composition that system 300 is playing. Composition indicator 312 may also represent the name of the composer who authored the composition and/or the artist who performed the composition. Musical notation 314 may represent the musical notes of the piece that device 310 is playing. Position indicator 315 may represent the portion of notation 314 that device 310 is currently playing. Piece indicator 316 may represent the piece of the composition that device 310 is playing (e.g., violin, saxophone, tuba, or any other instrument).

In some embodiments, musical notation may scroll across a screen as music is being played. In such embodiments, the rate of scrolling may be based on the rate at which the music is being played, and the position indicator may remain still while the musical notation moves across the screen. For example, musical notation 314 may scroll across screen 311 while position indicator 315 remains motionless. In other embodiments, a position indicator may scroll across the screen while music is being played. In such embodiments, the rate of scrolling may be based on the rate at which the music is being played, and the musical notation may remain still while the position indicator moves across the screen. When the position indicator reaches the end of the musical notation on display, a new display of musical notation may be provided and the position indicator may resume scrolling from the beginning of the new display of musical notation.

Some of the portable devices in system 300 can receive inputs that allow a user to control the playback of music. Devices 310, 320, 330, and 340 may each include one or more input devices (e.g., a touch screen display) with control inputs for controlling playback. For example, screen 311 may include controls 318 for a user to pause, rewind, or fastforward playback. When a user provides an input through controls 318 on device 310, all of the devices in system 300 may respond to the input (e.g., if a user selects pause on device 310, the other devices in system 300 may also pause playback).

While the previous discussion relates to outputs provided by device 310 and inputs received by device 310, it is understood that the other devices in system 300 can also include outputs and inputs similar to those described with respect to device 310. Moreover, it is understood that system 300 can include any number of portable devices for collectively generating sound and the different sound pieces can be distributed amongst the portable devices in any suitable manner. For example, system 300 may include eight portable devices and a musical composition that includes four pieces may be distributed amongst the eight devices so that each piece is performed by two of the devices.

In some embodiments, portable electronic devices can collectively generate sound based on user input. For example, each portable device in a network may generate sound in response to user input and the network may collectively generate sound based on inputs provided by a group of users (e.g., each user can virtually "play" his portable device along with the other users). In some embodiments, each user may provide inputs to a portable device to generate a piece of a musical composition so that the network of devices collectively generates the musical composition based on user inputs. In other words, a group of users can collectively perform a musical composition through a network of portable devices if each user provides inputs to a device representing a piece of the composition (e.g., violin, saxophone, tuba, or any other instrument).

Figure 4:
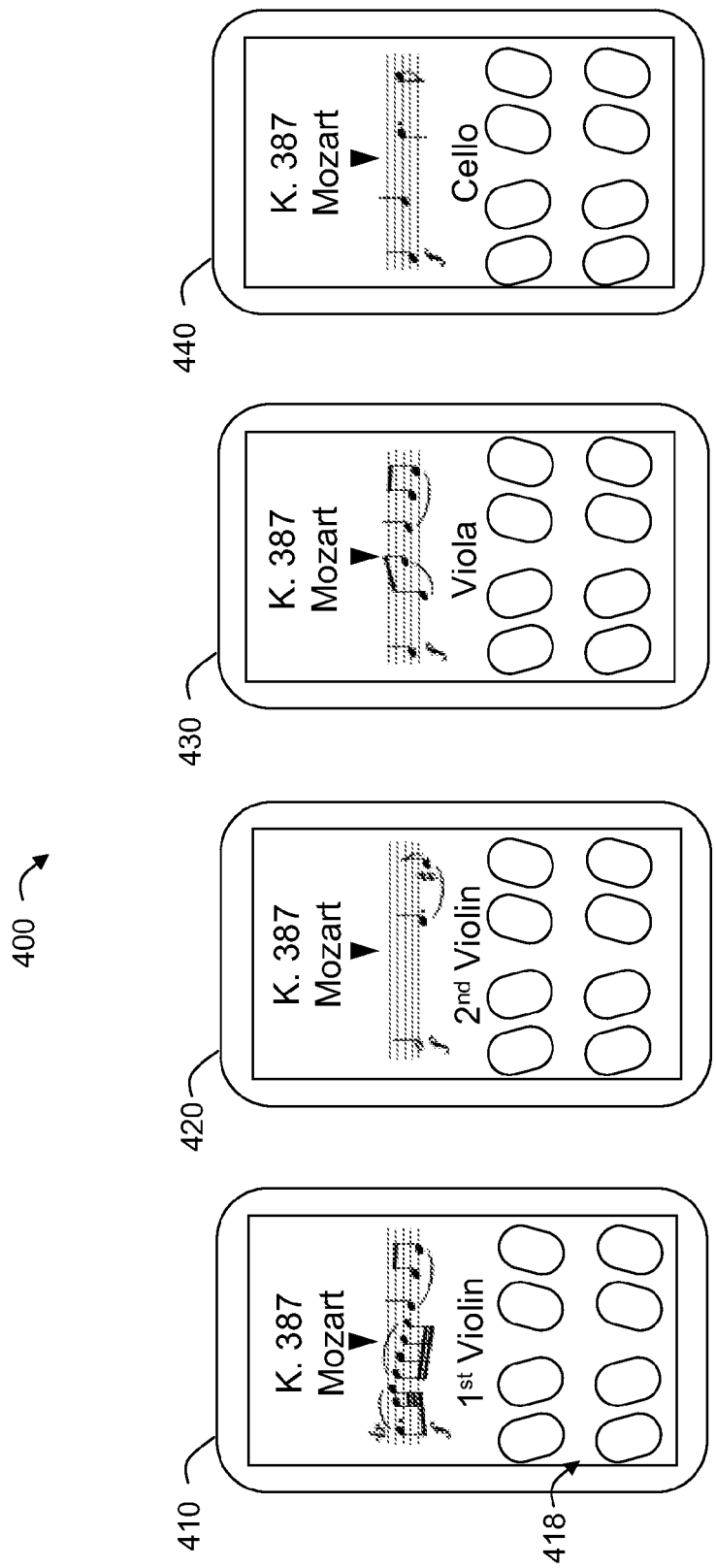
FIG. 4 is a schematic view of an illustrative system for performing music in accordance with one embodiment of the invention.

FIG. 4 includes system 400 for collectively generating sound in accordance with one embodiment of the invention. System 400 can include two or more portable devices. For example, system 400 can include portable devices 410, 420, 430, and 440 (see, e.g., portable devices 121-124 or portable devices 221-228). Each of the devices in system 400 can be part of a network. For example, system 400 can include a server (not shown) and devices 410, 420, 430 and 440 can be part of a bus network that includes the server (see, e.g., system 100). In another example, devices 410, 420, 430 and 440 can form a tree network without requiring a dedicated server (see, e.g., system 200). Any suitable network protocol or architecture can be used to form a network that includes the devices of system 400.

Each portable device in system 400 may be able to generate sound (e.g., through an integrated speaker, an external speaker coupled with the device, or headphones coupled with the device) based on a user input. In other words, each portable device in system 400 may be virtually played by a user. For example, a portable device may include one or more input interfaces and generate sound based on user inputs provided through the input interfaces. In some embodiments, a device may include motion detection circuitry and generate sound based on detected motion of the device (e.g., a user can virtually play a device by waving, tilting, shaking, or otherwise moving the device).

Devices 410, 420, 430, and 440 may each include an input interface and each device may receive user inputs through that interface and generate sounds based on the received user inputs. For example, device 410 may include input interface 418 that can be a group of virtual buttons on a touch screen. A user can press one or more of the buttons in interface 418 to provide user inputs to device 410. Based on the button or combination of buttons being pressed, device 410 can then generate sound.

In some embodiments, the sound generated by a portable device may also be a function of the instrument piece assigned to the device (e.g., violin, saxophone, tuba, or any other instrument). For example, a particular user input may represent a musical note, and the sound generated by a portable device in response to that input may represent the sound that the assigned instrument makes when performing that note.

A device which generates sound based on user input may provide outputs to the user to coordinate a performance. For example, each device in a network may provide outputs to its user so that a group of users can provide coordinated inputs to their devices (e.g., virtually "playing" their devices in a coordinated manner). In some embodiments, an output may include an indicator representing which composition of music is being performed (see, e.g., composition indicator 312). An output may also include musical notation (see, e.g., musical notation 314) representing the musical notes specified by the piece of the composition assigned to the device. In some embodiments, an output can include position indicator (see, e.g., position indicator 315) representing the progress of the performance along the musical notation. An output can also include piece indicator (see, e.g., piece indicator 316) representing the piece of a musical composition has been assigned to the device. In the context of system 400, devices 410, 420, 430 and 440 may each include a composition indicator, musical notation, position indicator, piece indicator, or any other suitable indicators related to music being performed.

It is understood that system 400 can include any number of portable devices for collectively generating sound and the different sound pieces can be distributed amongst the portable devices in any suitable manner. For example, system 400 may include eight portable devices and a musical composition that includes four pieces may be distributed amongst the eight devices so that each piece is performed by two of the devices.

In some embodiments, portable electronic devices can collectively generate sound to provide background music while one or more users sing. For example, a network of portable electronic devices can generate the music of a song while one or more users (e.g., performing users) sing the lyrics. Such embodiments can utilize a network of portable devices to facilitate singing performances similar to karaoke.

Figure 5:
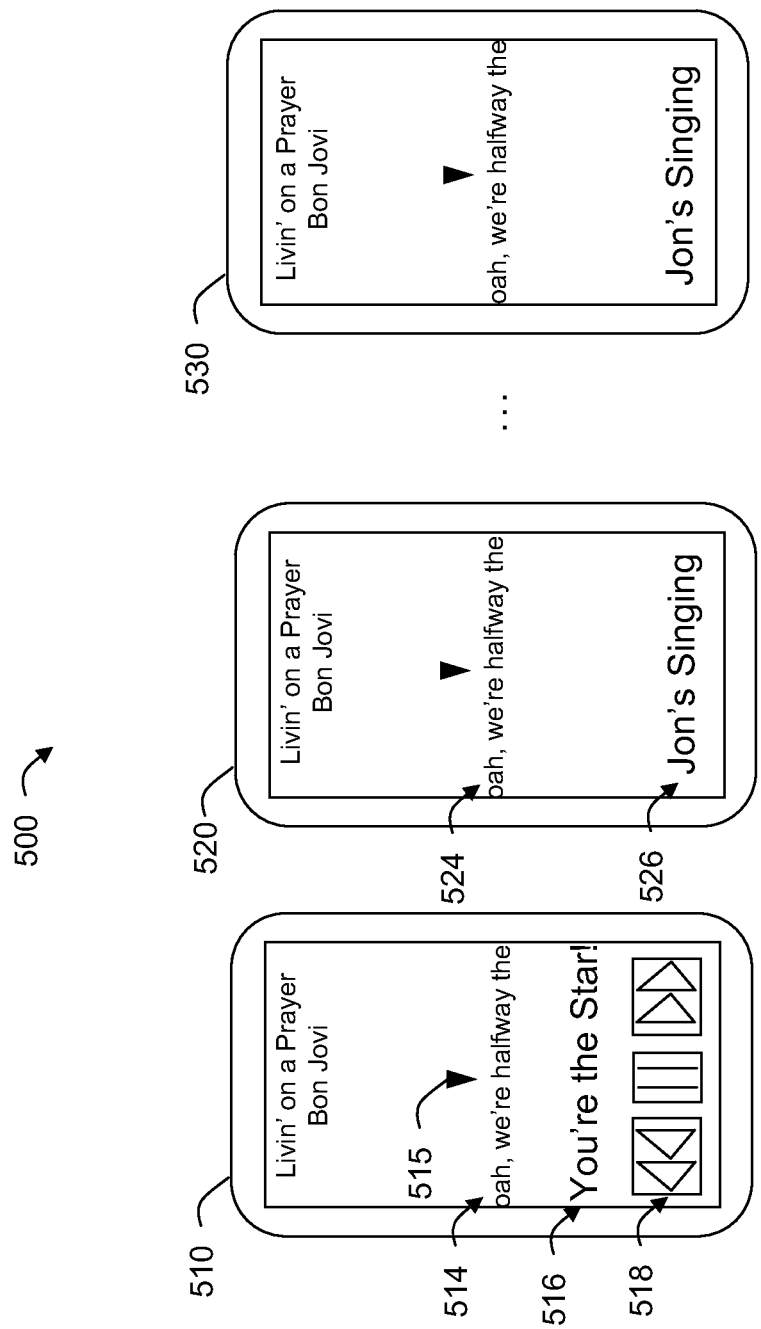
FIG. 5 is a schematic view of an illustrative system for performing music in accordance with one embodiment of the invention.

FIG. 5 includes system 500 for collectively generating sound in accordance with one embodiment of the invention. System 500 can include two or more portable devices. For example, system 500 can include portable devices 510, 520 and 530 (see, e.g., portable devices 121-124 or portable devices 221-228). Each of the devices in system 500 can be part of a network. For example, system 500 can include a server (not shown) and devices 510, 520 and 530 can be part of a bus network that includes the server (see, e.g., system 100). In another example, devices 510, 520 and 530 can form a tree network without requiring a dedicated server (see, e.g., system 200). Any suitable network protocol or architecture can be used to form a network that includes the devices of system 500.

Each portable device in system 500 may generate background music for a karaoke performance. In some embodiments, each device in system 500 may generate the same background music for the performance. In other embodiments, at least two of the devices in system 500 may generate a different piece (e.g., violin, saxophone, tuba, or any other instrument) of a background music composition for the performance (see, e.g., system 300). In yet other embodiments, each device in system 500 may generate a piece of a background music composition based on user input for the performance (see, e.g., system 400).

Some of the portable devices in system 500 can provide outputs representing the song being performed. In some embodiments, devices 510, 520 and 530 may each include a display screen and each device may use its display screen to provide information about the background music being played. For example, device 510 may display a screen including a composition indicator (see, e.g., composition indicator 312) that represents the name of the background song being provided. A composition indicator may also represent the name of the composer who originally wrote the song or the name of the artist who originally performed the song.

In some embodiments, devices 510, 520 and 530 may each include a display screen and one or more of the devices may use its display screen to provide written lyrics for the song being performed. For example, devices 510, 520, and 530 can provide lyrics (see, e.g., written lyrics 514 and 524) that represent the lyrics of the song being performed. In some embodiments, a device may also provide a position indicator that can represent the portion of the lyrics that is currently being performed. For example, position indicator 515 can represent the portion in written lyrics 514 that is currently being performed.

In some embodiments, written lyrics may scroll across a screen as a song is performed. In such embodiments, the rate of scrolling may be based on the rate at which the background music is being played, and the position indicator may remain still while the lyrics move across the screen. For example, written lyrics 514 may scroll across the screen of device 510 while position indicator 515 remains motionless. In other embodiments, a position indicator may scroll across the screen while a song is performed. In such embodiments, the rate of scrolling may be based on the rate at which the background music is being played, and the written lyrics may remain still while the position indicator moves across the screen. When the position indicator reaches the end of the written lyrics on display, a new display of written lyrics may be provided and the position indicator may resume scrolling from the beginning of the new display of written lyrics.

In some embodiments, the devices in system 500 can display performance indicators representing which user or users are currently performing (e.g., who is currently singing). For example, device 510 can provide performance indicator 516 representing that the user of device 510 is the current performer while devices 520 and 530 can provide indicators (see, e.g., performance indicator 526) representing that their users are spectators.

While the embodiment shown in FIG. 5 may represent a solo performance by the user of device 510, group performances can be provided in accordance with some embodiments. For example, two or more users may be performing karaoke to the same background music (e.g., performing the same song). In some embodiments, each device that belongs to a performing user may provide the same written lyrics (see, e.g., written lyrics 514). In some embodiments, devices belonging to different performing users may provide different written lyrics to each user. For example, if two users are performing a duet with multiple parts, one user's device may provide him with the written lyrics for the male part and the other user's device may provide her with the written lyrics for the female part.

In some embodiments, devices in system 500 can have different functions based on which user or users are currently performing. For example, if the user of portable device 510 is the current performer, device 510 may provide him with different options than the options that the other devices (e.g., device 520 and 530) provide to their users. In some embodiments, the performer's device may provide him with controls 518 for controlling the playback of the background music (see, e.g., controls 318). When a performer provides an input through controls 518 on device 510, all of the devices in system 500 may respond to the input (e.g., if a user selects pause on device 510, the other devices in system 500 may also pause playback of background music). In some embodiments, a device may only display written lyrics to a user if that user is performing. For example, the spectators' devices may not display the lyrics of the song being performed, and the spectators may have to listen to the performer(s) to determine the lyrics of the song.

In some embodiments, devices in system 500 can selectively monitor sound based on which user or users are currently performing. For example, if the user of portable device 510 is the current performer, device 510 may use a microphone to monitor its user's performance. In some embodiments, the input from the microphone may then be transmitted to one or more other devices in the network. For example, one or more other devices in the network may be able to record or play the performer's singing.

It is understood that system 500 can include any number of portable devices for collectively generating sound to provide background music while one or more users sing. Moreover, it is understood that any number of users can perform while other devices provide background music. For example, a network of ten portable electronic devices can collectively generate sound to provide background music while three users sing along with the background music.

In some embodiments, one or more users may be able to control the collective generation of sound. For example, one or more users may be able to provide configuration inputs to a device in a network to control the network's collective generation of sound.

Figure 6:
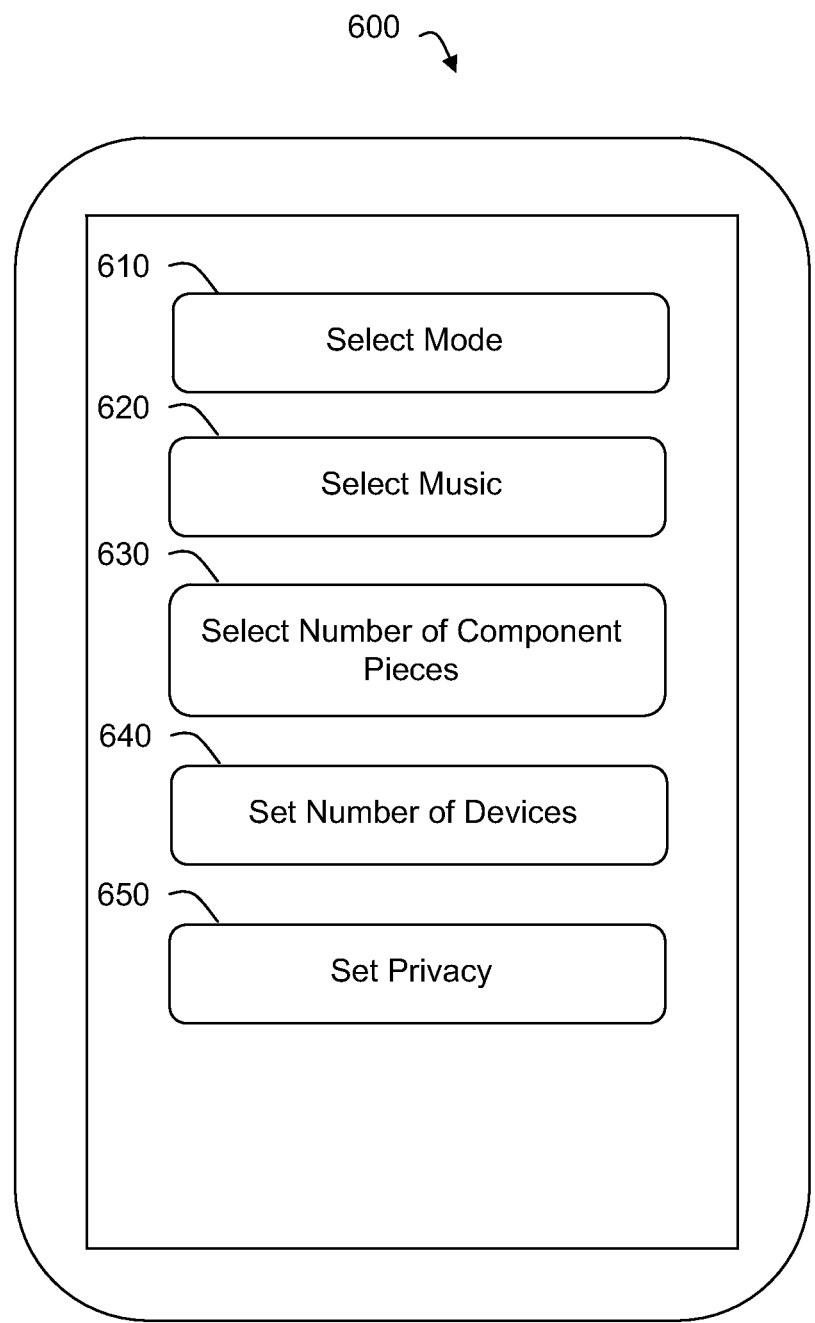
FIG. 6 is a schematic view of an illustrative configuration screen in accordance with one embodiment of the invention.

FIG. 6 includes screen 600 for configuring a network of portable devices to collectively generate sound in accordance with one embodiment of the invention. One or more portable devices in a network of devices can provide screen 600 (e.g., devices 121-124 or devices 221-228). The one or more portable devices displaying screen 600 may receive user inputs related to screen 600 through one or more input devices (e.g., a touch screen display or computer mouse). One or more users can select options on screen 600 to control the network's collective generation of sound.

In some embodiments, any portable device in a network can receive inputs for configuring the network to collectively generate sound. For example, any of devices 121-124 or devices 221-228 can display screen 600 and receive configuration inputs. In other embodiments, only certain portable devices can receive inputs for configuring the network to collectively generate sound. For example, only a device that originally formed the network can receive inputs for configuring the network in accordance with some embodiments. In some embodiments, only a higher-level device (e.g., master device 221 in FIG. 2A or master devices 222 and 224 in FIG. 2B) can receive inputs for configuring the network.

Screen 600 can include option 610 for selecting a mode for collectively generating sound. For example, a user can select option 610 to set a mode for a network of portable devices to collectively generate sound. Potential modes include, for example, generating different pieces of a composition (see, e.g., system 300), generating different pieces of a composition based on user input (see, e.g., system 400), or generating background music for a karaoke performance (see, e.g., system 500).

Screen 600 can include option 620 for selecting music (e.g., a musical composition or a song) to collectively generate. For example, a user can select option 620 to choose music for a network of portable devices to collectively generate. After selecting option 620, a user may be presented with a list of music that the network can collectively provide. Screen 600 may provide additional options in connection with option 620 for searching and selecting music. For example, to assist a user in making a selection, a user may be able to narrow a list of potential music by selecting an artist or genre.

In some embodiments, a network may only be able to provide music that is stored on one or more of the devices. For example, one or more of the portable devices in a network may have music stored for playback in a traditional media player application that may also be suitable for collective playback through a network. The network may poll each device in the network to generate a list of potential music for collective playback through the network. If a user selects music that is not stored on each device, the network may coordinate sharing amongst the devices so that each device has access to the music (e.g., the music can be transferred amongst devices before playback or streamed amongst devices during playback). Accordingly, the network may limit the music selection to music stored on one of the devices or music owned by one of the devices' users. In other embodiments, a network may be able to provide music that is stored on one or more servers (e.g., a music server accessible over the internet). For example, one or more devices in the network can query a server to provide a list of music available from the server. If the user selects music that is not stored on any of the devices, the music can be downloaded from the server and shared amongst the devices in the network.

Screen 600 can include option 630 for selecting the number of component pieces to collectively generate. For example, a user can select option 630 to choose the number of pieces (e.g., violin, saxophone, tuba, or any other instrument) for a network of portable devices to collectively generate. In some embodiments, option 630 may be based upon the music selected using option 620. For example, the choices available for option 630 may be a function of the music selected for option 620 (e.g., some music may have a full orchestra breakdown while other music may only include a lead guitar, a bass guitar, and drums). Accordingly, a user may not be able to select option 630 until music has been selected for option 620.

After selecting option 630, a user may be presented with a list of component pieces that the network can provide in accordance with the selected music. In some embodiments, a user may be able to mute or disable particular component pieces (e.g., triangle) after selecting option 630. In some embodiments, a user may be able to consolidate particular component pieces after selecting option 630 (e.g., consolidate a complete orchestra arrangement to four component pieces).

Screen 600 can include option 640 for selecting the number of devices to collectively generate sound. For example, a user can select option 640 to choose the number of portable devices in a network that will collectively generate sound. In some embodiments, option 640 may allow a user to cap the number of devices that will collectively generate sound. In other embodiments, option 640 may allow a user to specify that an unlimited number of users will be able to collectively generate sound. In some embodiments, option 640 may allow a user to select particular parameters for determining which devices will be able to collectively generate sound (e.g., a user can specify that only devices within 15 ft or 5 m of her device will be able to collectively generate sound). In some embodiments, option 640 may allow a user to select particular devices that will be able to collectively generate sound (e.g., a user can select her friends' devices).

Screen 600 can include option 650 for securing the network of devices that will collectively generate sound. For example, a user can select option 650 to specify whether the network for collectively generating sound will be a public or a private network. If the user specifies that the network will be a private network, the user may be able to provide a password or personal identification number (PIN) to secure the network. In such cases, users of other devices may need to provide the same password or PIN to join the network and collectively generate sound.

Figure 7:
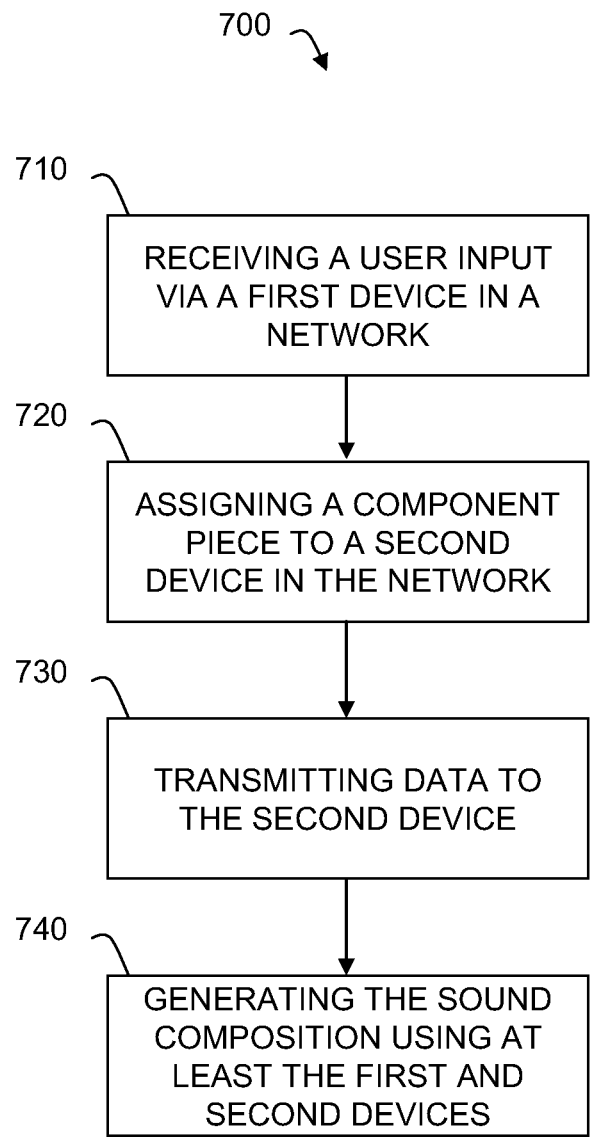
FIG. 7 is a flowchart of an illustrative process for collectively generating sound in accordance with one embodiment of the invention.

FIG. 7 includes process 700 for collectively generating sounds in accordance with one embodiment of the invention. Process 700 can be used to collectively generate a sound composition (e.g., a musical composition or a sound effect) that includes multiple component pieces. Process 700 can be performed by a portable device in a network (e.g., devices 121-124 or devices 221-228). In some embodiments, process 700 can be performed by any suitable portable device in a network. In other embodiments, process 700 can only be performed by certain devices in a network (e.g., devices that originally formed the network or higher-level devices in the network).

At block 710, a portable device in a network can receive a user input. For example, a portable device can receive user input configuring the network for collectively generating sound (see, e.g., FIG. 6). In another example, a portable device can receive user input to initiate the process of collectively generating a user network (e.g., a "start" command).

At block 720, a component piece can be assigned to a second device in the network. For example, a second violin piece can be assigned to a device in the network (see, e.g., device 320 and device 420). In some embodiments, a single component piece may be assigned to several other devices in the network. In some embodiments, multiple component pieces may be assigned to a single other device in the network. Any component of a system can assign a component piece at block 720. For example, any device in a system (see, e.g., devices 121-124 shown in FIG. 1, devices 221-224 shown in FIG. 2A and devices 221-228 shown in FIG. 2B) or any server in the system (see, e.g., server 110 shown in FIG. 1) can assign one or more component pieces to one or more devices in the system. In some embodiments, a device may even assign a component piece to itself at block 720.

Assigning component pieces to other devices in a network may be performed based on one or more factors. In some embodiments, component pieces may be assigned based on location (e.g., to replicate the layout of a formal orchestra). A more detailed discussion of such configurations is provided below (see FIG. 10 and accompanying discussion). In some embodiments, component pieces may be assigned based on the preferences of the users of other devices (e.g., a user who has indicated a preference for the cello may be assigned a cello piece). In some embodiments, component pieces may be assigned based on how a user is holding his or her portable device. For example, a portable device may be assigned a component piece that corresponds to guitar if the device's user is holding the device like a guitar (e.g., holding the device at the angle or height of a guitar), moving the device in a manner that one would move a guitar (e.g., rocking the device back and forth), providing inputs associated with a guitar (e.g., strumming keys on the device) or any combination thereof. In yet another example, a portable device may be assigned a component piece that corresponds to drums if the device's user is holding the device like a drumstick (e.g., holding the device at the angle or height of a drumstick), moving the device in a manner that one would move a drumstick (e.g., moving the device in a repetitive up and down motion), providing inputs associated with a guitar (e.g., tapping the device) or any combination thereof. Accordingly, the network may recognize how the users are using each device and automatically assign a component piece to each device based on the recognized movement.

At block 730, a portable device can transmit data to the second device. The data transmitted at block 730 can include commands, music, information about music, synchronization information, any other suitable form of data or any combination thereof. A system of portable devices can transmit data to one or more devices using any suitable method for communicating data. In some embodiments, a portable device may simply transmit a command to another device to play music already stored on the other device. In other embodiments, a portable device may stream music to another device at block 730. In some embodiments, a device may also transmit information about music to another device (e.g., composition information, musical notation, or written lyrics). In some embodiments, a portable device may transmit synchronization information to another device so that the devices can later generate music in a synchronized manner. In some embodiments, a device may transmit data to multiple devices at block 730.

In some embodiments, a server connected to a network of portable devices (e.g., server 110) may transmit data to one or more of the devices (e.g., devices 121-124) at block 730. In some embodiments, a server connected to a network of devices (e.g., server 110) may coordinate transmissions of data amongst portable devices (e.g., devices 121-124). In some embodiments, a device may not transmit data directly to another device. For example, device 221 may transmit data indirectly to device 226 by first transmitting the data to device 222 along with an instruction to relay the data to device 226.

In some embodiments, data can be transmitted amongst devices in accordance with a Musical Instrument Digital Interface (e.g., MIDI 1.0). For example, data that includes MIDI messages can be transmitted amongst devices. Such MIDI messages may include instructions for generating sound (e.g., a sequence of musical notes). In some embodiments, transmitting data amongst devices in accordance with a MIDI protocol may be advantageous because it may decrease the bandwidth needed to transmit data. In some embodiments, a device may only be transmitted MIDI data corresponding to the device's assigned component piece. For example, the second device may only be transmitted MIDI data that corresponds to the component piece assigned at block 720.

In some embodiments, a device that receives a MIDI message may be able to generate customized sound based on the message. For example, a user may be able to adjust the volume, timbre, tonality, pitch, or any other characteristic of sound that a device generates in response to a MIDI message. In some embodiments, data including a MIDI configuration file (e.g., a file that specifies what sounds a device should generate in response to each type of MIDI command) may be transmitted amongst devices. For example, a device receiving a MIDI configuration file that corresponds to a particular instrument may then generate a sound representing that instrument in response to a MIDI message. In some embodiments, multiple MIDI configuration files may be stored on a device and the device's user may be able to select a MIDI configuration file before sound is generated and/or change MIDI configuration files while sound is being generated. In some embodiments, multiple MIDI configuration files may be stored on a device and a server or another device may be able to instruct the device to use a particular MIDI configuration file. For example, a device may be instructed to use a violin MIDI configuration file before it is streamed notes corresponding to the violin piece of a musical composition.

In some embodiments, transmissions amongst devices may take different amounts of time depending on the distances between devices and whether the transmissions are direct. Accordingly, a device or a network of devices may take precautionary actions to prevent synchronization problems at block 730. For example, a device may transmit data with precise time markers representing when sound will be generated. In another example, a device may transmit data with delay instructions (e.g., the transmission with the shortest delay will include a long delay instruction so that the receiving device does not generate sound prematurely). In yet another example, a device may transmit data to different devices at different times (e.g., the transmission with the longest delay can be sent first while the transmission with the shortest delay may be sent last).

At block 740, at least the first and second devices can generate the overall sound composition. For example, each device may generate the component piece assigned to it at block 720. The devices can generate their respective component pieces in a synchronized manner so that the overall sound composition is produced. Any suitable type of sound composition can be generated by the devices at block 740. In some embodiments, the devices can collectively generate an entire musical composition (see, e.g., system 300). In other embodiments, the devices can collectively generate an entire musical composition based on inputs provided by users (see, e.g., system 400). In yet other embodiments, the devices can collectively generate background music for a karaoke performance (see, e.g., system 500).

While process 700 describes an embodiment in which the device that receives the user input (i.e., the first device introduced in block 710) also generates sound at block 740, it is understood that the device that receives the user input may not actually generate the sound composition. For example, the device that receives the user input may be a control device that is located remotely from the devices that collectively generate sound.

In some embodiments, the devices collectively generating sound can generate a blend of an assigned component piece and the overall sound composition at block 740. For example, if a device is assigned a violin component piece at block 720, that device may generate a blend of sound that emphasizes the violin piece but also includes the overall sound composition at block 740. In some embodiments, each device may generate a blend of sound that includes the component piece assigned to the respective device and the overall sound composition. Any suitable combination of the component piece and the overall sound composition can be used to form the blend. For example, a device may provide the component piece at full volume while providing the overall sound composition at 20% volume. The blend may be designed to maximize the audio quality of the overall music heard by a listener while still preserving the effect of the distributed component pieces. Accordingly, a listener may hear the total sound composition even if some of the other devices are outside the listener's range of hearing. For example, a listener that is relatively far from the device assigned the vocal component piece may still hear that component piece through the overall composition provided by the nearby devices. Such a feature may mitigate any loss of audio quality while still maintaining the effect of the separate component pieces. For example, such a feature may be especially useful when devices are collectively generating sound while moving around a larger environment that includes other noises. Moreover, such a feature may provide a greater resolution for creating three-dimensional sound effects.

The blend of a component piece and overall sound composition can be generated automatically by each device or the network without any user intervention. A device can generate a blend of a component piece and overall sound composition based on any suitable factor or combination of factors. The device can generate a blend of a component piece and overall sound composition based on a characteristic of the network in which the device resides, the component piece assigned to the device, the overall sound composition or any combination thereof.

In some embodiments, a device can generate a blend of a component piece and overall sound composition based on the number of devices collectively generating sound. For example, the blend may place less emphasis on the overall sound composition if there are more devices collectively generating sound because the additional devices can make it easier for listeners to hear the other tracks. In another example, the blend may place more emphasis on the overall sound composition if there are relatively few devices collectively generating sound because it may be hard for listeners to hear the other tracks.

In some embodiments, a device can generate a blend of a component piece and overall sound composition based on the proximity of two or more devices collectively generating sound. If two or more devices are in close proximity, then it may be easier for listeners near the two devices to hear the respective component pieces assigned to the devices. Accordingly, each of the two or more devices may not need to provide the sound component assigned to the other device given that device's proximity. In such embodiments, the blend may be adjusted at the level of individual component pieces and the component pieces assigned to nearby devices may be reduced or removed altogether.

In some embodiments, a device can generate a blend of a component piece and overall sound composition based on the collective movement of the devices collectively generating sound. One or more of the devices may use an embedded sensor (e.g., an accelerometer or compass) to determine if the device is moving and such information can be used to influence the blending. For example, many devices moving rapidly may indicate that the users are dancing and the volume of the overall sound composition in the blend may be increased.

In some embodiments, a device can generate a blend of a component piece and overall sound composition based on the sound produced by nearby devices. For example, a device may use an embedded microphone to determine if there are any devices and which component pieces those devices are providing. Continuing the example, the device may then generate a blend of the assigned component piece and overall sound composition that accounts for (e.g., reduces or mutes) the component pieces produced by the nearby devices. In another example, a device may determine the location of nearby devices (e.g., by detecting the location itself or by receiving location information from the other devices), the output capabilities of those devices (e.g., by directly receiving information from each device or by looking up the specifications for each device's speaker), or any combination thereof and then generate the blend based on the sound expected from the nearby devices.

In some embodiments, a device can generate a blend of an assigned component piece and overall sound composition based on the ambient noise in an environment. For example, a device may use an embedded microphone to determine the ambient noise in the device's environment and then generate a blend in which the volume level of the overall sound composition is proportional to the volume of the ambient noise.

In some embodiments, a device can generate a blend of a component piece and overall sound composition based on the importance of the component piece assigned to the device. For example, if a device is assigned a featured component piece (e.g., first violin), the device may generate a blend that heavily emphasizes that component piece. In some embodiments, the device may adjust the blend dynamically based on the varying importance of the component piece. For example, the device may play the overall sound composition at a relatively high volume during periods when the assigned component piece is inactive. In another example, the device may diminish or mute the overall sound composition during periods when the assigned component piece is especially important (e.g., during a solo). In such embodiments, the device may determine the importance of the component piece using any suitable technique. For example, the device may receive data from another device or server in the network that specifies the importance of the component piece assigned to the device. In another example, the device may analyze the component piece to determine the importance of the component piece (e.g., by calculating the average volume of the component pieces relative to the overall sound composition or performing any other suitable analysis on the component signal and/or the overall sound composition).

In some embodiments, a device can generate a blend of a component piece and overall sound composition based on the importance of the component pieces assigned to one or more nearby devices. For example, if a device is assigned a featured component piece (e.g., first violin), the nearby devices (e.g., devices within hearing distance) may generate a blend that subtracts that component piece (e.g., the first violin) from the overall sound composition. In some embodiments, a device may adjust the blend dynamically based on the varying importance of the component pieces of nearby devices. For example, a device may diminish or mute a component piece that is assigned to a nearby device during periods when the assigned component piece is especially important (e.g., during a solo). In this manner, the devices may emphasize the component pieces of nearby devices when they are especially important. A device may determine the importance of the component piece using any suitable technique. For example, the device may receive data from another device or server in the network that specifies the importance of the component piece assigned to the device. In another example, the device may analyze the component piece to determine the importance of the component piece (e.g., by calculating the average volume of the component pieces relative to the overall sound composition or performing any other suitable analysis on the component signal and/or the overall sound composition).

The network of portable devices can continue to generate sound until the sound composition ends or a device receives another user input. For example, a user may provide an input to pause the music. In another example, the network may stop generating sound after the sound composition ends and wait for a user to select additional music.

While the previous discussion of process 700 described the process as being conducted by a single device, it is understood that the process can be divided amongst multiple portable devices (e.g., one device can receive a user input, another device can assign component pieces to at least one other device, a third device can transmit data to the other devices, and then at least all three devices can generate the sound composition). Moreover, portions of the process can be performed by servers in a network. For example, one or more portable devices in a network can receive a user input, a server in the network (e.g., server 110) can assign component pieces to the portable devices and transmit data to the devices, and the portable devices can generate the sound composition.

Figure 8:
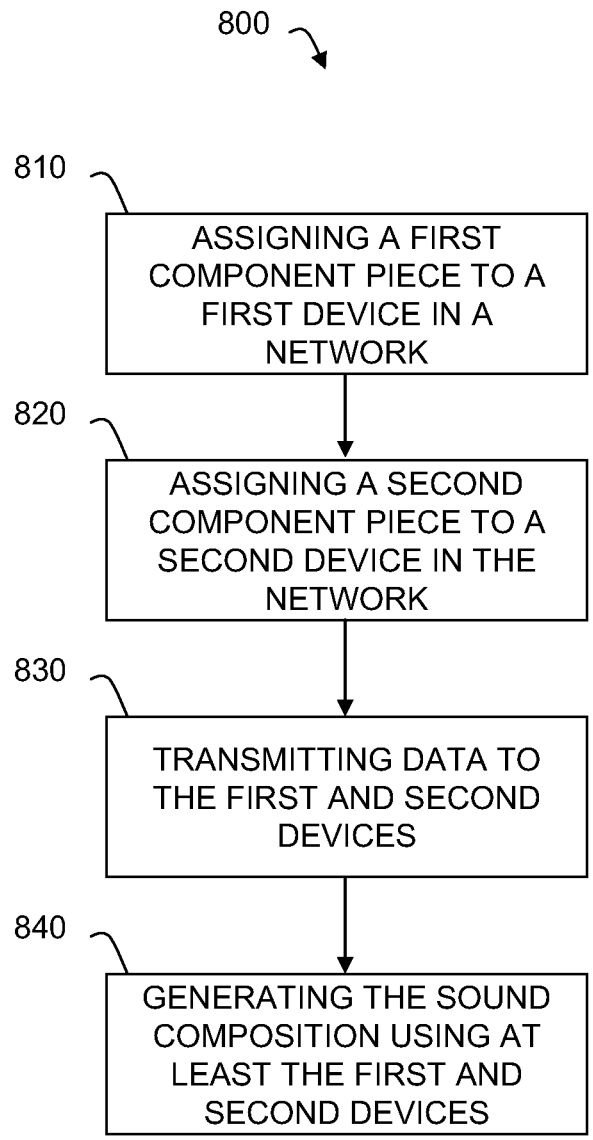
FIG. 8 is a flowchart of an illustrative process for collectively generating sound in accordance with one embodiment of the invention.

As previously explained, different component pieces of a sound composition can be assigned to different devices and then the devices can collectively generate the sound composition by providing their respective component pieces. FIG. 8 includes process 800 for collectively generating sounds in accordance with one embodiment of the invention. Process 800 can be performed by a portable device in a network (e.g., devices 121-124 or devices 221-228). In some embodiments, process 800 can be performed by any suitable portable device in a network. In other embodiments, process 800 can only be performed by certain devices in a network (e.g., devices that originally formed the network or higher-level devices in the network).

A first component piece is assigned to a first device in a network at block 810, and a second component piece is assigned to a second device in the network at block 820. For example, a violin component piece may be assigned to the first device and a viola component piece may be assigned to the second device. Any suitable techniques can be used to assign the first and second component pieces at blocks 810 and 820, including, for example, the techniques described in connection with block 720 in process 700.

At block 830, data is transmitted to the first and second devices. The data transmitted at block 830 can include commands, music, information about music, synchronization information, any other suitable form of data or any combination thereof. The technique used to transmit data to the first and second devices can be substantially similar to the technique used to transmit data to a single device, and the previous description of block 730 of process 700 can be applied to block 830.

At block 840, the sound composition can be collectively generated using at least the first and second devices. For example, each device may generate sound that emphasizes its assigned component piece. In some embodiments, the first device may generate a blend of the first component piece and the sound composition, and the second device may generate a blend of the second component piece and the sound composition. In some embodiments, the blends generated by each device may be based at least partially on one or more factors. For example, the blends generated by the first and second devices may be based at least partially on the number of devices collectively generating sound. Continuing the example, the blends may include greater emphasis on the individual component pieces if there are more devices collectively generating sound or, alternatively, the blends may include a more balanced sound if there are less devices collectively generating sound. In another example, the blends generated by the first and second devices may be based at least partially on the proximity of the first device to the second device. Continuing this example, the blends may include greater emphasis on the individual component pieces if the devices are in close proximity to each other or, alternatively, the blends may include a more balanced sound if the devices are spread apart. In yet another example, the blends generated by the first and second devices may be based at least partially on the collective movement of the first and second devices. For example, if the devices are bouncing up and down in a manner that suggests that the users are dancing, the emphasis each blend places on the individual component pieces can be adjusted accordingly. For example, more emphasis may be placed on the individual component pieces assigned to devices that are actively moving than those devices that are relatively motionless.

It is understood that process 800 can be divided amongst multiple portable devices (e.g., one device can assign component pieces to at least one other device, a third device can transmit data to the other devices, and then at least all three devices can generate the sound composition). Moreover, portions of the process can be performed by servers in a network. For example, a server in the network (e.g., server 110) can assign component pieces to the portable devices and transmit data to the devices, and the portable devices can generate the sound composition.

As previously explained in connection with block 740 of process 700, a blend of a component piece and an overall sound composition can be based on any suitable factor or combinations of factors. For example, the blend of a component piece and an overall sound composition can be based on a characteristic of the network, such as the number of devices in the network that are collectively generating sound or the proximity of the devices in the network that are collectively generating sound.

Figure 9:
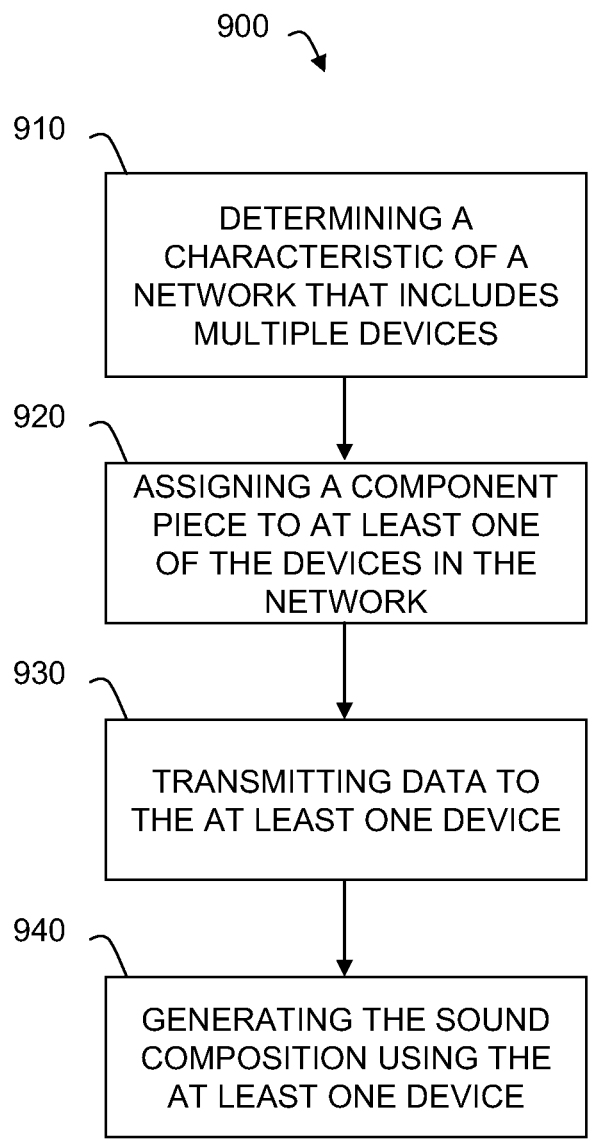
FIG. 9 is a flowchart of an illustrative process for collectively generating sound in accordance with one embodiment of the invention.

FIG. 9 includes process 900 for collectively generating sounds in accordance with one embodiment of the invention. Process 900 can be performed by a portable device in a network (e.g., devices 121-124 or devices 221-228). In some embodiments, process 900 can be performed by any suitable portable device in a network. In other embodiments, process 900 can only be performed by certain devices in a network (e.g., devices that originally formed the network or higher-level devices in the network).

At block 910, a characteristic of a network that includes multiple devices can be determined. For example, the number of devices collectively generating sound can be determined at block 910. In another example, the proximity of the devices collectively generating sound can be determined at block 910. In yet another example, the audio output capabilities of the devices collectively generating sound can be determined at block 910. In some embodiments, multiple characteristics of the network can be determined at block 910. One or more characteristics of the network can be determined at block 910 by polling devices through wireless communications circuitry or by taking measurements with a sensor (e.g., an embedded microphone). The characteristics determined at block 910 can then be used to generate a blend at block 940, which is discussed below.

A component piece can be assigned to at least one of the devices in the network at block 920, and data can be transmitted to the at least one device at block 930. Blocks 920 and 930 are substantially similar, respectively, to blocks 720 and 730 of process 700, and the previous description of the latter can be applied to the former.

The sound composition is generated using the at least one device at block 940. Block 940 is substantially similar to block 740 of process 700 and the previous description of the latter can be applied to the former. However, in some embodiments, block 940 may include generating a blend of the assigned component piece and the overall sound composition based at least partially on the determined characteristic of the network.

Any suitable characteristic of the network, or combinations of characteristics, may affect how a blend is generated. In some embodiments, the number of devices collectively generating sound may be determined at block 910 and then the assigned component piece and overall sound composition may be blended at block 940 based on the number of devices. For example, if there are relatively few devices collectively generating sound, the volume of the overall sound composition in the blend may be increased to ensure adequate audio quality for listeners. In another example, if the network includes a relatively large number of devices, the volume of the overall sound composition in the blend may be diminished or muted.

In some embodiments, the proximity of devices collectively generating sound may be determined at block 910 and then the assigned component piece and overall sound composition may be blended at block 940 based on the proximity of the devices. For example, if the network includes devices that are relatively spread apart, the volume of the overall sound composition in the blend may be increased to ensure adequate audio quality for listeners. In another example, if the network includes a relatively dense arrangement of devices, the volume of the overall sound composition in the blend may be diminished or muted.

While the above embodiments discussed two particular characteristics of a network that can be used when blending a component piece and an overall sound composition, it is understood that any suitable characteristic of the network can be determined at block 910 and used at block 940. For example, the audio output capabilities of the network can be determined and then influence the blending of the component piece and the overall sound composition.

While the previous discussion of process 900 described the process as being conducted by a single device, it is understood that the process can be divided amongst multiple portable devices (e.g., one device can determine a characteristic of the network, another device can assign component pieces to at least one other device, a third device can transmit data to the other devices, and then at least all three devices can generate the sound composition). Moreover, portions of the process can be performed by servers in a network. For example, a server in the network (e.g., server 110) can determine a characteristic of the network, assign component pieces to the portable devices and transmit data to the devices, and the portable devices can generate the sound composition.

Figure 10:
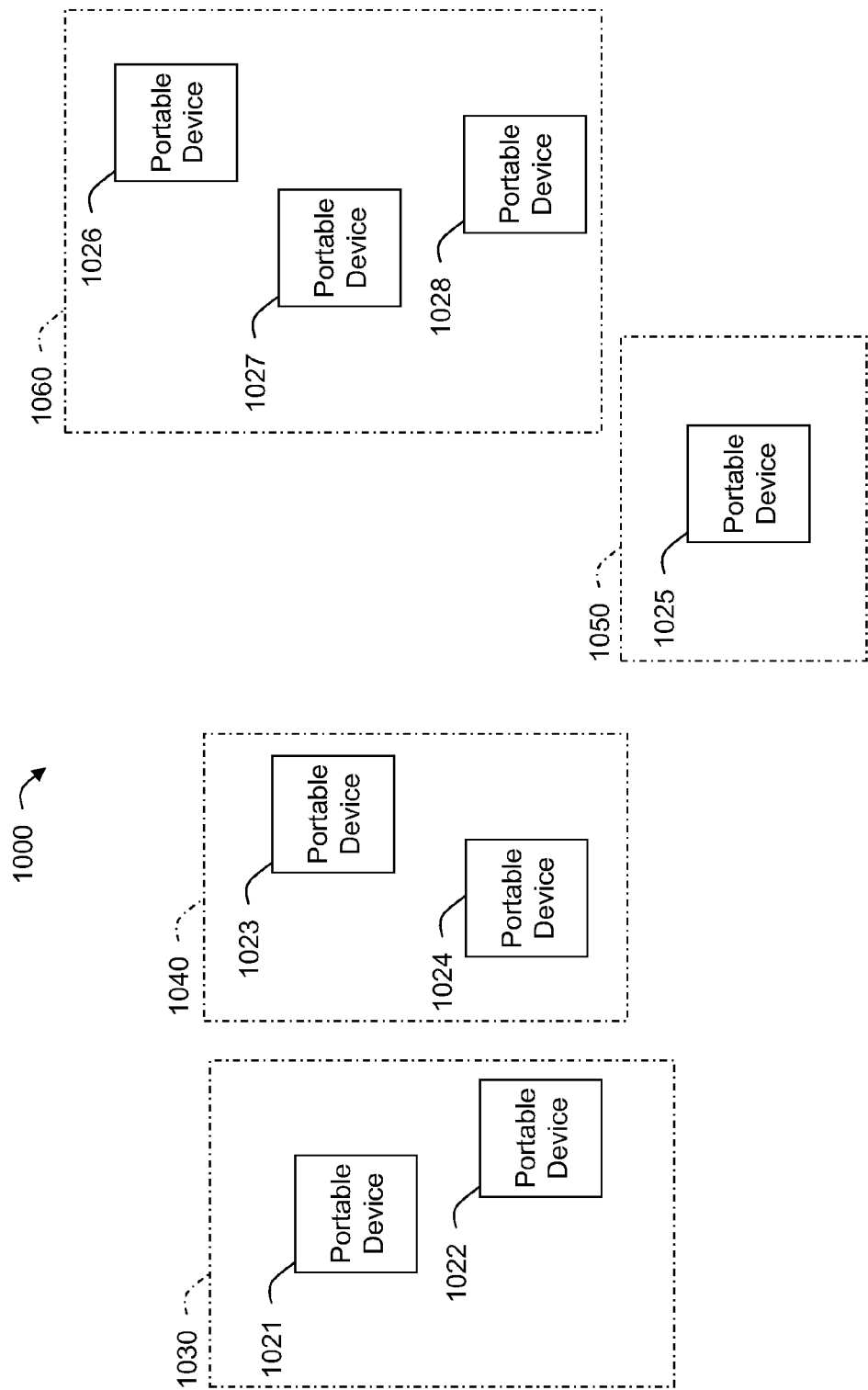
FIG. 10 is a schematic view of an illustrative system for collectively generating sound in accordance with one embodiment of the invention.

As previously discussed with respect to block 720 of process 700, component pieces of music can be assigned to devices based on their location. FIG. 10 includes system 1000 in which component pieces have been assigned to devices based on their physical location. System 1000 can include two or more portable devices. For example, system 1000 can include portable devices 1021-1028 (see, e.g., portable devices 121-124 or portable devices 221-228). Each portable device in system 1000 can generate sound (e.g., through an integrated speaker, an external speaker coupled with the device, or headphones coupled with the device). Each of the devices in system 1000 can be part of a network. For example, system 1000 can include a server (not shown) and devices 1021-1028 can be part of a bus network that includes the server (see, e.g., system 100). In another example, devices 1021-1028 can form a tree network without requiring a dedicated server (see, e.g., system 200). Any suitable network protocol or architecture can be used to form a network that includes the devices of system 1000.

When assigning component pieces to devices in a network, the assignment may be based at least partially on the location of each device. In some embodiments, component pieces can be assigned so that nearby devices are assigned the same component pieces. In other embodiments, component pieces can be assigned so that component pieces are scattered amongst the space (e.g., not clustered together). Determining the location of each device (e.g., for the purposes of assigning component pieces) can be accomplished using any suitable technique or combination of techniques.

In system 1000, the network may form clusters of devices (e.g., clusters 1030, 1040, 1050 and 1060). The number of clusters may be based on the number of component pieces in a musical composition or song (see, e.g., option 630 for selecting the number of component pieces). In some embodiments, the number of clusters may be based on the configuration of the network.

The devices included in each cluster can be based on the proximity of the devices to each other. For example, cluster 1050 may only include one device (e.g., device 1025) because there may be no other nearby devices. A network of portable devices can determine the proximity and/or location of devices using any suitable technique or combination of techniques. For example, a network can determine the location of devices using radar, signal triangulation, timing the delays of signal transmission, accelerometer data, a global position system (GPS), any other suitable technique, or any combination thereof.

After the devices have been grouped together in clusters, component pieces can be assigned to each cluster. In some embodiments, component pieces can be assigned to each cluster based on the location of the cluster. For example, component pieces can be assigned to each cluster to recreate the location of instruments in a traditional orchestra (e.g., first violin pieces may be assigned to cluster 1030, second violin pieces may be assigned to cluster 1040, viola pieces may be assigned to cluster 1050 and cello pieces may be assigned to cluster 1060. In some embodiments, component pieces can be assigned to each cluster based on the number of devices in each cluster (e.g., a more important piece can be assigned to cluster 1060 because it has the most devices).

Figure 11:
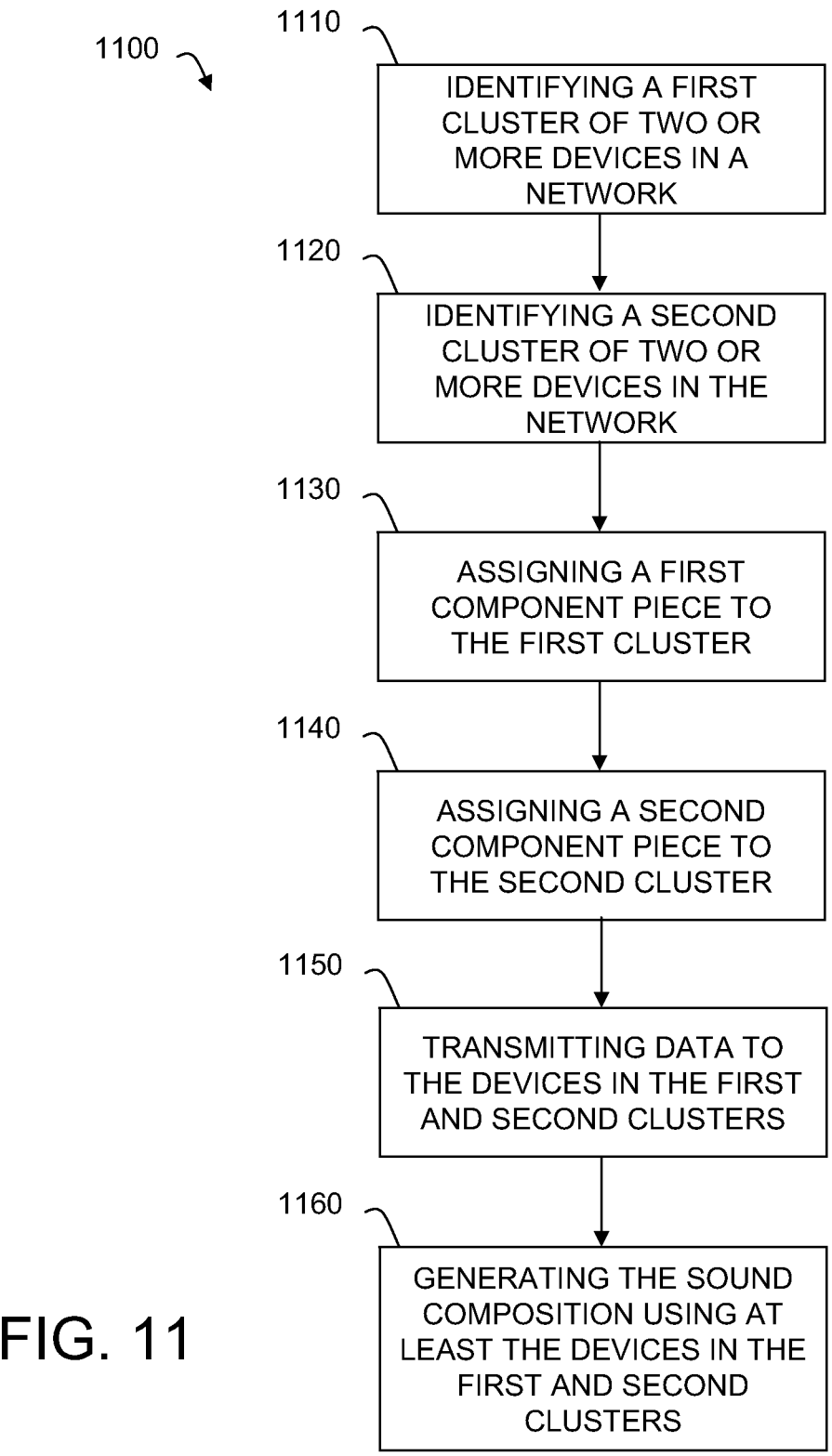
FIG. 11 is a flowchart of an illustrative process for collectively generating sound in accordance with one embodiment of the invention.

FIG. 11 includes process 1100 for collectively generating sounds in accordance with one embodiment of the invention. Process 1100 can be performed by a portable device in a network (e.g., devices 121-124 or devices 221-228). In some embodiments, process 1100 can be performed by any suitable portable device in a network. In other embodiments, process 1100 can only be performed by certain devices in a network (e.g., devices that originally formed the network or higher-level devices in the network).

At block 1110, a first cluster of two or more devices in a network can be identified. In some embodiments, clusters can be identified based on the location of the devices. For example, two or more devices that are near each other can be identified as a cluster. In some embodiments, a maximum distance may be predefined so that each cluster can only include devices that are within that maximum distance. In some embodiments, the maximum distance for each cluster may be dynamic and may change with the size of the network. For example, the maximum distance may increase as the size of the network increases.

At block 1120, a second cluster of two or more devices in a network can be identified. The same techniques used to identify the first cluster at block 1110 can also be applied to identify the second cluster at block 1120. In some embodiments, the first and second clusters may be mutually exclusive of each other. For example, in those embodiments, no device may be included in both clusters. In other embodiments, the first and second clusters may overlap so that a device can be included in both clusters. For example, each cluster may be assigned a different component piece, and a device that is included in both clusters may provide both component pieces.

A first component piece may be assigned to a first cluster at block 1130, and a second component piece may be assigned to a second cluster at block 1140. The techniques used to assign component pieces to clusters may be substantially similar to the techniques used to assign component pieces to individual devices, and the description provided in connection with block 720 of process 700 may be applied to both block 1130 and block 1140.

At block 1150, data can be transmitted to the devices in the first and second clusters. The techniques used to transmit data to devices in the clusters may be substantially similar to the techniques used to transmit data to individual devices, and the description provided in connection with block 730 of process 700 may be applied to block 1150.

At block 1160, the sound composition can be generated using at least the devices in the first and second clusters. For example, the devices in the first cluster can provide their assigned component piece and the devices in the second cluster can provide their assigned component piece. In some embodiments, the devices in each cluster may generate a blend of the component piece assigned to its own cluster as well as the component piece assigned to the other cluster. Such a technique may blend the sound produced by the first and second clusters while still preserving the effect of the individual component pieces. In some embodiments, the devices in each cluster may generate a blend of the assigned component piece and the overall sound composition. Devices in a cluster can blend a component piece and the overall sound composition using the same techniques as individual devices, and the discussion related to block 740 of process 700 can apply to block 1160.

While the previous discussion of process 1100 described the process as being conducted by a single device, it is understood that the process can be divided amongst multiple portable devices (e.g., one device can identify a first cluster and assign a component piece to the first cluster, another device can identify a second cluster and assigned a different component piece to the second cluster, a third device can transmit data to the other devices, and then at least all three devices can generate the sound composition). Moreover, portions of the process can be performed by servers in a network. For example, a server in the network (e.g., server 110) can identify a first cluster, identify a second cluster, assign component pieces to the portable devices in the first and second clusters and transmit data to the devices, and the portable devices can generate the sound composition.

In some embodiments, a network of devices can collectively generate three-dimensional sound effects based on the location of devices collectively generating sound. For example, the network of devices can collectively generate sounds to create the effect of sound movement. In some embodiments, sounds can travel across the network from side-to-side or from front-to-back or vice versa. For example, referring to system 1000 shown in FIG. 10, a sound replicating helicopter rotors in flight may be played sequentially by devices in cluster 1030, cluster 1040, cluster 1050, and cluster 1060 to create the effect of the helicopter flying in that direction. In some embodiments, the network of portable devices can enhance such sound effects using collective visual displays. For example, devices in a network can sequential illuminate their display screen to create the effect of light moving along with the sound. Any suitable technique can be used to illuminate device displays to accompany sound. For example, device displays can be illuminated using any combination of video or solid colors to create visual effects that complement a sound composition or any movement of the sound composition through the system (e.g., component piece movement or volume movement).

In some embodiments, one or more electronic devices can be dynamically reassigned a component piece to create a three-dimensional sound effect. As previously discussed, a component piece can be assigned to a device based at least partially on the location of the device. In some embodiments, a component piece may be sequentially reassigned to a series of devices to create the illusion of movement traversing the various locations of the devices. For example, a violin component piece can be dynamically assigned to a sequence of devices to create the impression that a violinist is moving through a crowd.

Figure 12:
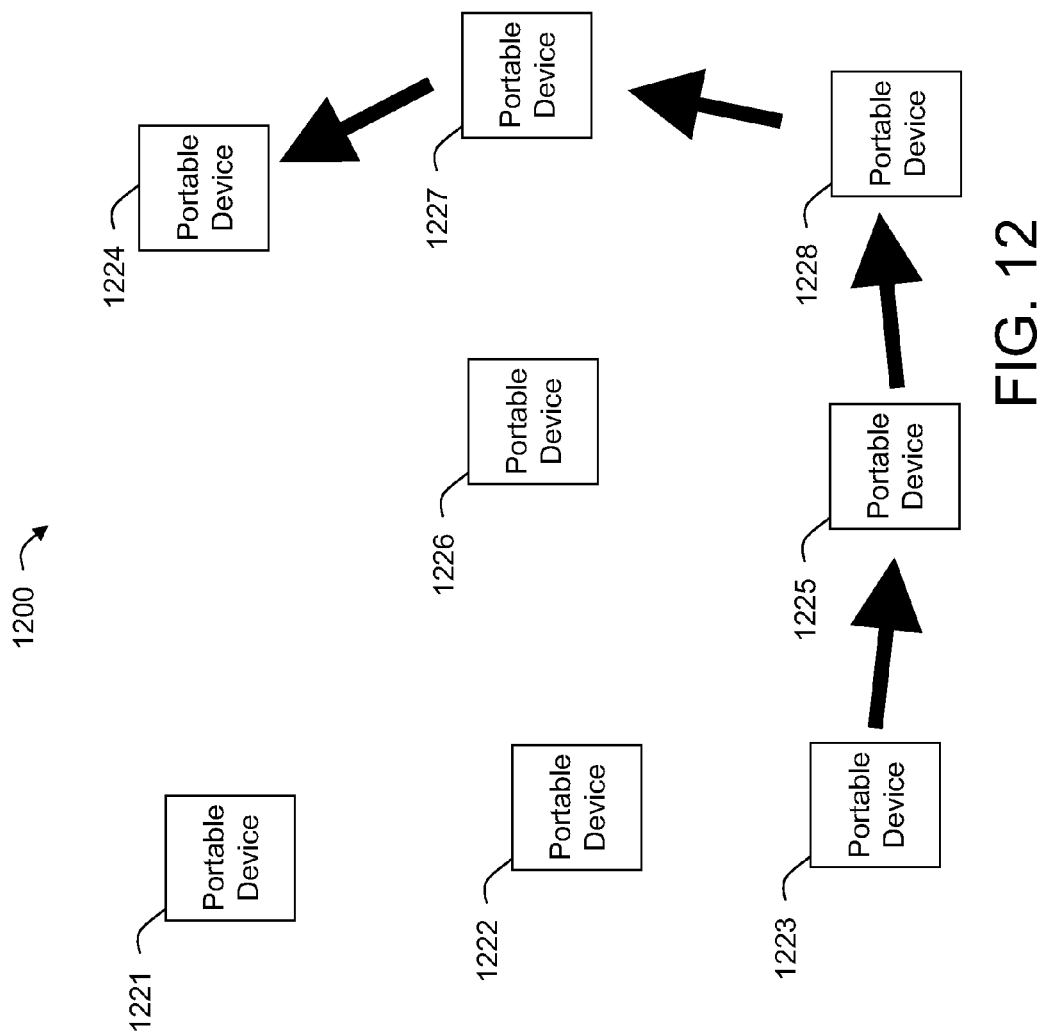
FIG. 12 is a schematic view of an illustrative system for collectively generating sound in accordance with one embodiment of the invention.

FIG. 12 includes system 1200 in which a component piece is reassigned to devices based on their physical location. System 1200 can include two or more portable devices. For example, system 1200 can include portable devices 1221-1228 (see, e.g., portable devices 121-124 or portable devices 221-228). Each portable device in system 1200 can generate sound (e.g., through an integrated speaker, an external speaker coupled with the device, or headphones coupled with the device). Each of the devices in system 1200 can be part of a network. For example, system 1200 can include a server (not shown) and devices 1221-1228 can be part of a bus network that includes the server (see, e.g., system 100). In another example, devices 1221-1228 can form a tree network without requiring a dedicated server (see, e.g., system 200). Any suitable network protocol or architecture can be used to form a network that includes the devices of system 1200.

As previously discussed, one or more component piece can be reassigned based on the location of devices to create a three-dimensional movement effect. In the embodiment shown in FIG. 12, the arrows denote that one or more component pieces can be reassigned from one device to another to create the effect of the component piece circling the group of devices. For example, a component piece can be assigned to device 1223, then reassigned to device 1225, then reassigned to device 1228 and so forth. Any suitable timing can be used to conduct the reassignment. For example, the component piece may be assigned to one device for a predetermined period of time. In some embodiments, the timing of the reassignments may vary to further reinforce the illusion of movement. In some embodiments, the speed of the movement effect may be specified by a user input (e.g., from a control device) and that user input may affect the timing of the reassignments.

Any suitable movement direction or pattern can be implemented in accordance with the disclosure. In some embodiments, the movement direction or pattern can be specified by a user input (e.g., from a control device) and that user input may affect which devices the one or more component pieces are reassigned to. While the embodiment shown in FIG. 12 shows a component piece being reassigned around the perimeter of a network, it is understood that any other movement patterns can be implemented using the same principles. For example, one or more component pieces can be reassigned in sequence to create a wave or ripple effect. Moreover, the resolution and complexity of the movement patterns can be greatly increased as the number of participating devices increases.

Figure 13:
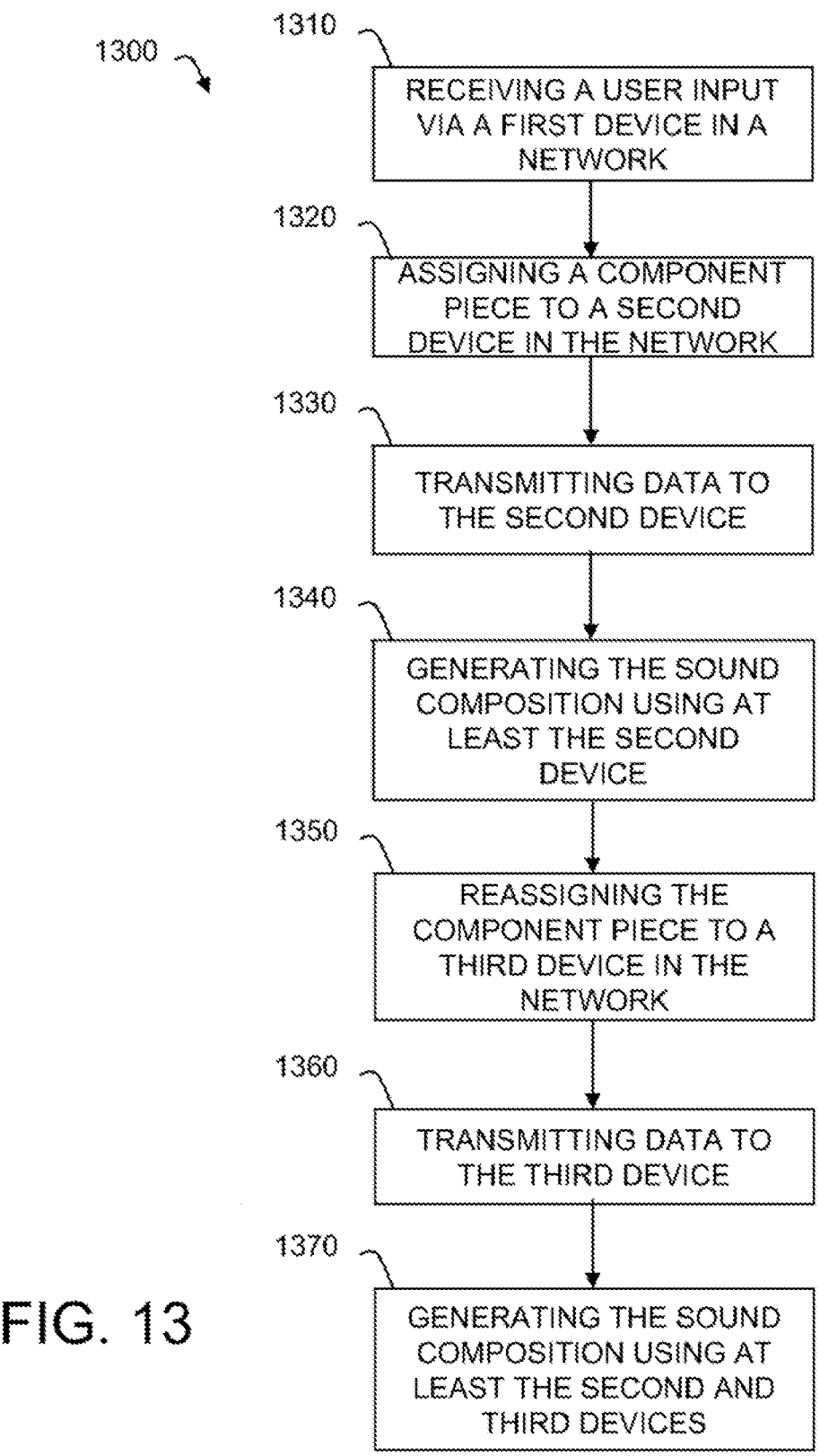
FIG. 13 is a flowchart of an illustrative process for collectively generating sound in accordance with one embodiment of the invention.

FIG. 13 includes process 1300 for collectively generating sounds in accordance with one embodiment of the invention. Process 1300 can be performed by a portable device in a network (e.g., devices 121-124 or devices 221-228). In some embodiments, process 1300 can be performed by any suitable portable device in a network. In other embodiments, process 1300 can only be performed by certain devices in a network (e.g., devices that originally formed the network or higher-level devices in the network).

In accordance with process 1300, a user input can be received via a first device in a network at block 1310, a component piece can be assigned to a second device in the network at block 1320, data can be transmitted to the second device at block 1330 and the sound composition can be generated using at least the second device at block 1340. Blocks 1310, 1320, 1330 and 1340 are substantially similar, respectively, to blocks 710, 720, 730 and 740 of process 700, and the previous description of the latter can be applied to the former.

At block 1350, the component piece can be reassigned to a third device in the network. The component piece can be reassigned to the third device based on the location of the third device. For example, the component piece can be reassigned to the third device to create the impression that the sound of the component piece is moving in the direction of the third device. In some embodiments, a component piece can be reassigned to multiple new devices at block 1350. For example, the component piece may be reassigned to an entire set of new devices to create a wave or ripple effect.

At block 1360, data can be transmitted to the third device. The techniques used to transmit data to a third device after reassigning a component piece may be substantially similar to the techniques used to transmit data to the original assignee of the component piece, and the description provided in connection with block 730 of process 700 may be applied to block 1360.

At block 1370, the sound composition can be generated using at least the second and third devices. The techniques used to generate sound using at least two other devices may be substantially similar to the techniques used to generate sound in process 700, and the description provided in connection with block 740 of process 700 may be applied to block 1370. However, in some embodiments, each of the second and the third devices may generate a different blend of the component piece and the overall sound composition. For example, the third device may emphasize the component piece while the second device may generate a blend in which the component piece is diminished to create a fading effect in comparison to the third device.

While the previous discussion of process 1300 described the process as being conducted by a single device, it is understood that the process can be divided amongst multiple portable devices. Moreover, portions of the process can be performed by servers in a network. For example, a server in the network (e.g., server 110) can assign and reassign the component piece while the portable devices can generate the sound composition.

In some embodiments, a network may include one or more beacon devices and the assignment of one or more component pieces may be based on the relative location of the one or more beacon devices. For example, a network may sequentially reassign a component piece to create the impression that the sound of the component piece is coalescing around a beacon device (e.g., by sequentially reassigning the component piece to devices that are closer to the beacon device). Continuing the example, the network may continue to monitor the location of the beacon device and reassign the component piece accordingly so that, if the beacon device moves, the network can create the sensation of the component piece following the beacon device. In another example, a network may sequentially reassign a component piece to create the impression that the sound of the component piece is dispersing from a beacon device (e.g., by sequentially reassigning the component piece to devices that are further from the beacon device). Such an implementation may create the sensation that the beacon device is repelling the sound.

Figure 14:
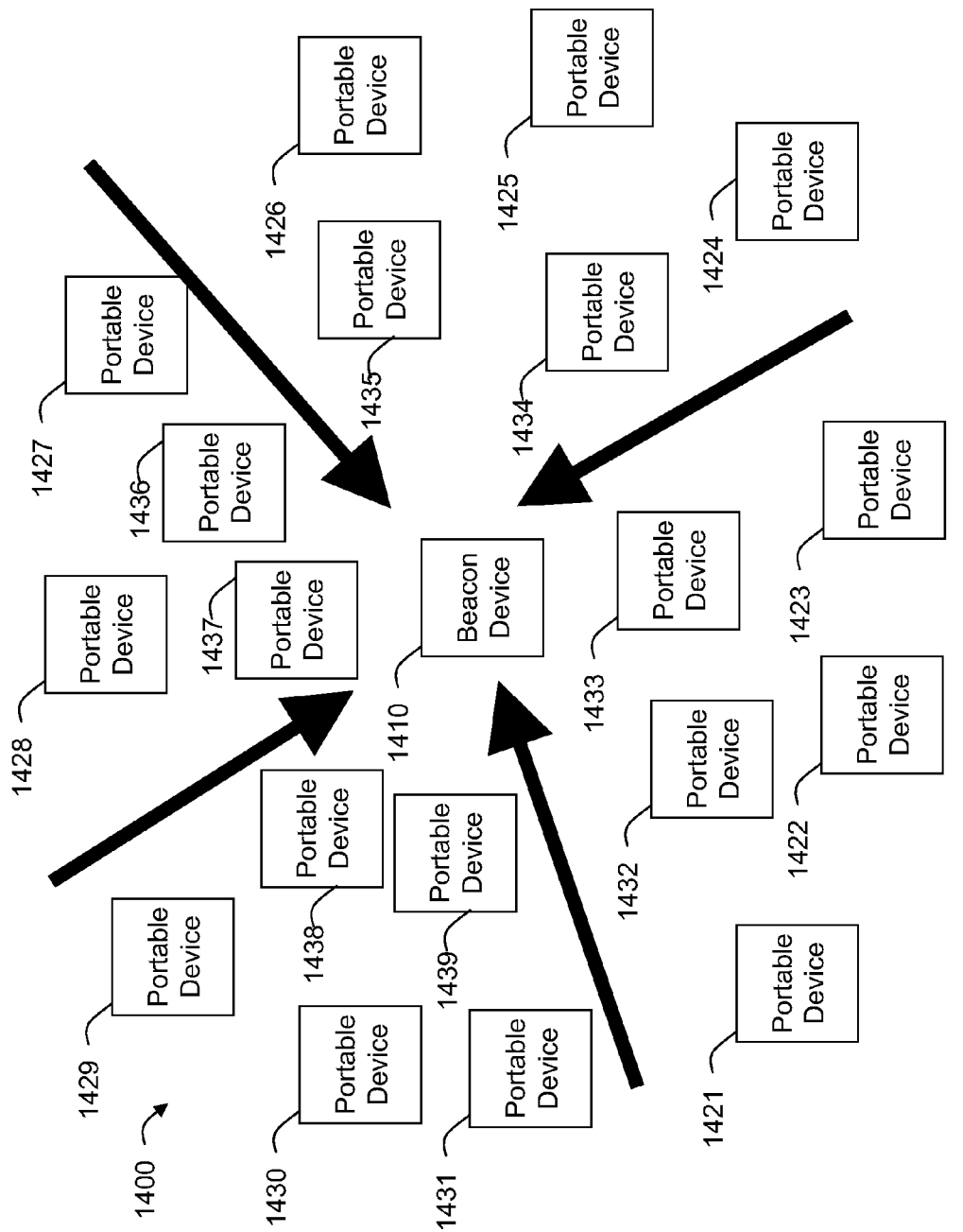
FIG. 14 is a schematic view of an illustrative system for collectively generating sound in accordance with one embodiment of the invention.

FIG. 14 includes system 1400 in which a component piece is reassigned to devices based on their physical location. System 1400 can include two or more portable devices. For example, system 1400 can include portable devices 1421-1439 (see, e.g., portable devices 121-124 or portable devices 221-228). Each portable device in system 1400 can generate sound (e.g., through an integrated speaker, an external speaker coupled with the device, or headphones coupled with the device). Each of the devices in system 1400 can be part of a network. For example, system 1400 can include a server (not shown) and devices 1421-1439 can be part of a bus network that includes the server (see, e.g., system 100). In another example, devices 1421-1439 can form a tree network without requiring a dedicated server (see, e.g., system 200). Any suitable network protocol or architecture can be used to form a network that includes the devices of system 1400.

System 1400 also includes beacon device 1410 that can be used to influence movement of sound through system 1400. For example, beacon device 1410 can be used to pool or coalesce one or more component pieces of sound towards it or disperse or repel one or more component piece away from it. In some embodiments, beacon device 1410 can include specialized hardware for determining its location and communicating with other devices. For example, beacon device 1410 may include high-precision circuitry for determining its location and robust wireless communications circuitry for communicating with several of devices 1421-1439 at the same time. In some embodiments, beacon device 1410 can be substantially similar to portable devices 1421-1439 (see, e.g., portable devices 121-124 or portable devices 221-228) and may itself generate one or more component pieces. Beacon device 1410 may also be part of the same network as devices 1421-1439.

System 1400 can determine the location of beacon device 1410 using any suitable technique. For example, the techniques described for determining the location of devices when assigning component signals (see, e.g., discussion related to block 720 of process 700) can also be used to determine the location of a beacon device.

After determining the location of beacon device 1410, system 1400 can then assign and reassign one or more component pieces based on that location. For example, system 1400 can reassign a component piece so that it appears that the sound is pooling around beacon device 1410. In the embodiment shown in FIG. 14, the arrows denote that a component piece can be reassigned in a sequence that leads towards the beacon device to create the effect of the sound of the component piece converging on the beacon device. For example, a component piece can be assigned to devices along the outer circle of system 1400 (e.g., devices 1421-1431) and then reassigned to devices along the inner circle of system 1400 (e.g., devices 1432-1439). In this manner, system 1400 can create the appearance of the sound of the component piece converging on beacon device 1410. While the embodiment shown in FIG. 14 only portrays devices 1421-1439, it is understood that the concept can be applied to much larger networks (e.g., hundreds of devices, thousands of devices or tens of thousands of devices) and it is appreciated that the quality of effects will improve as the size of the network increases.

Figure 15:
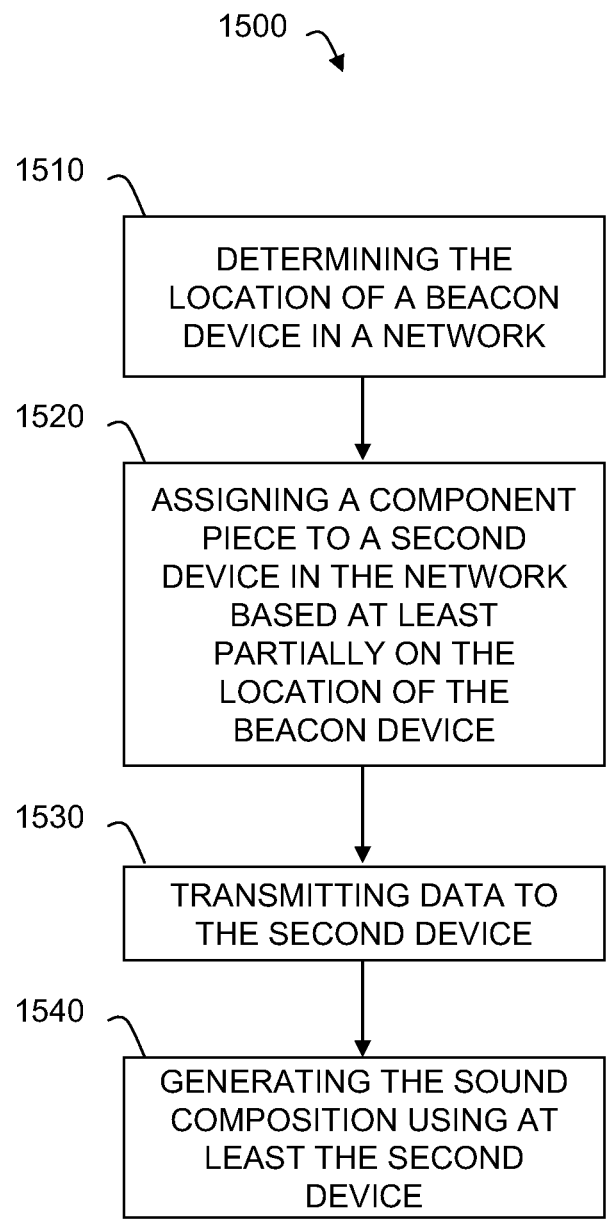
FIG. 15 is a flowchart of an illustrative process for collectively generating sound in accordance with one embodiment of the invention.

FIG. 15 includes process 1500 for collectively generating sounds in accordance with one embodiment of the invention. Process 1500 can be performed by a portable device in a network (e.g., devices 121-124 or devices 221-228). The network may include a beacon device (e.g., beacon device 1410) for triggering audio movement.

At block 1510, the location of a beacon device can be determined. As previously discussed, the location of a beacon device can be determined using any suitable technique. For example, a network can determine the location of the beacon device using radar, signal triangulation, timing the delays of signal transmission, accelerometer data, a global position system (GPS), any other suitable technique, or any combination thereof.

At block 1520, a component piece can be assigned to a second device in the network based at least partially on the location of the beacon device. For example, the component piece can be assigned so that the second device is near to the beacon device (e.g., to create the effect of sound pooling around the beacon device). In another example, the component piece can be assigned so that the second device is far from the beacon device (e.g., to create the effect of sound repelled from the beacon device).

In accordance with process 1500, data is transmitted to the second device at block 1530. Block 1530 is substantially similar to block 730 of process 700, and the previous description of the latter can be applied to the former.

At block 1540, a sound composition is generated using the second device. Block 1540 is substantially similar to blocks 740 of process 700, and the previous description of the latter can be applied to the former. However, only a single device may generate the sound composition at block 1540 rather than the multiple devices described in block 740. Although, it is understood that multiple devices can still be used to generate the sound composition at block 1540 in accordance with the disclosure.

In some embodiments, process 1500 may also include reassigning the component piece if the beacon device moves. For example, a network may monitor the location of the beacon device to determine if it has moved and then reassign one or more component pieces accordingly.

Figure 16:
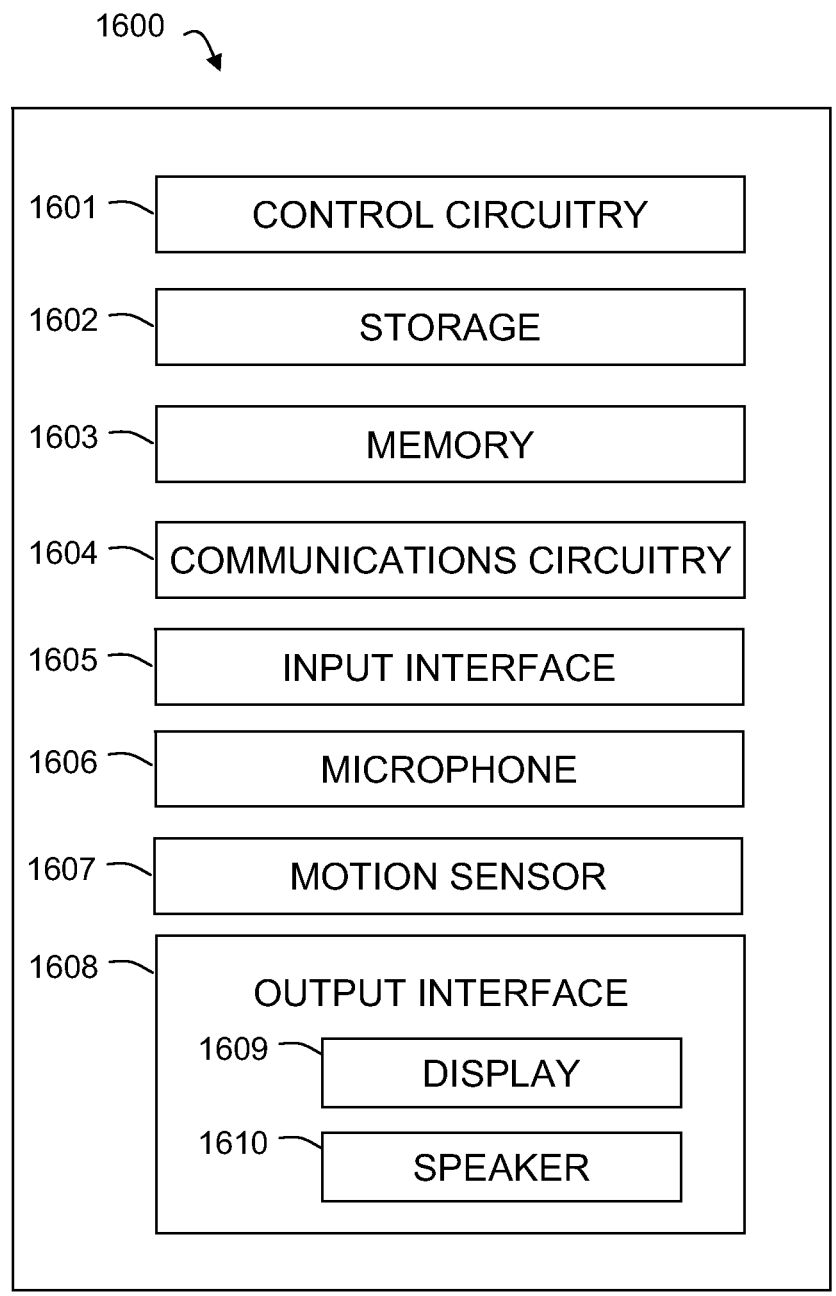
FIG. 16 is a schematic view of an illustrative device in accordance with one embodiment of the invention.

As previously discussed, any suitable portable electronic device can be used to collectively generate sound in accordance with the disclosure. FIG. 16 is a schematic view of an illustrative portable device for collectively generating sound in accordance with one embodiment of the invention. Device 1600 can be used to collectively generate audio in accordance with any embodiments of the disclosure, including, for example, FIGS. 1-15. For example, the description of device 1600 can be applied to each of devices 121-124, devices 221-228, devices 1021-1028, devices 1221-1228, beacon device 1410 and devices 1421-1439.

Portable device 1600 can include control circuitry 1601, storage 1602, memory 1603, communications circuitry 1604, input interface 1605 and output interface 1608. In some embodiments, one or more of the components of user device 1600 can be combined or omitted. For example, storage 1602 and memory 1603 can be combined into a single mechanism for storing data. In some embodiments, user device 1600 can include other components not combined or included in those shown in FIG. 16, such as a power supply (e.g., a battery or kinetics) or a bus. In some embodiments, user device 1600 can include several instances of the components shown in FIG. 16 but, for the sake of simplicity, only one of each of the components is shown in FIG. 16.

User device 1600 can include any suitable type of electronic device operative to communicate with other devices and generate sound. For example, user device 1600 can include a personal computer (e.g., a desktop personal computer or a laptop personal computer), a portable communications device (e.g., a cellular telephone, a personal e-mail or messaging device, a pocket-sized personal computer, a personal digital assistant (PDA)), or any other suitable device for generating sound collectively.

Control circuitry 1601 can include any processing circuitry or processor operative to control the operations and performance of a user device of the type of user device 1600. Storage 1602 and memory 1603, which can be combined can include, for example, one or more storage mediums or memory used in an electronic device of the type of user device 1600.

Communications circuitry 1604 can include any suitable communications circuitry operative to connect to a communications network and to transmit communications (e.g., voice or data) from device 1600 to other devices within the communications network. Communications circuitry 1604 can be operative to interface with the communications network using any suitable communications protocol such as, for example, Wi-Fi (e.g., a 802.11 protocol), Bluetooth®, radio frequency systems (e.g., 900 MHz, 15.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network or protocol), infrared, TCP/IP (e.g., any of the protocols used in each of the TCP/IP layers), HTTP, BitTorrent, FTP, RTP, RTSP, SSH, Voice over IP (VOIP), any other communications protocol, or any combination thereof. In some embodiments, communications circuitry 1604 can be operative to provide wired communications paths for user device 1600.

Input interface 1605 can include any suitable mechanism or component for receiving inputs from a user. In some embodiments, input interface can include a touch screen, roller ball, controller, joystick, keyboard, mouse, any other suitable mechanism for receiving user input or any combination thereof. Input interface 1605 can also include circuitry operative to convert (and encode/decode, if necessary) analog signals and other signals into digital data, for example in any manner typical of an electronic device of the type of user device 1600. Any mechanism or component in input interface 1605 can be electrically coupled with control circuitry 1601, storage 1602, memory 1603, communications circuitry 1604, any other suitable components within device 1600, or any combination thereof.

Microphone 1606 can include any suitable component for detecting audio signals. For example, microphone 1606 can include any suitable type of sensor for detecting audio signals. In some embodiments, microphone 1606 can include one or more sensors that generate electrical signals and circuitry for processing the electrical signals generated by the one or more sensors. Microphone 1606 can be electrically coupled with control circuitry 1601, storage 1602, memory 1603, communications circuitry 1604, any other suitable components within device 1600, or any combination thereof.

Motion sensor 1607 can include any suitable component for detecting the motion of device 1600. In some embodiments, motion sensor 1607 can include one or more accelerometers. In some embodiments, motion sensor 1607 can include one or more compasses. Motion sensor 1607 can be electrically coupled with control circuitry 1601, storage 1602, memory 1603, communications circuitry 1604, any other suitable components within device 1600, or any combination thereof.

Output interface 1608 can include any suitable mechanism or component for providing outputs to a user. In some embodiments, output interface 1608 can include display 1609 and speaker 1610. Output interface 1608 can also include circuitry operative to convert (and encode/decode, if necessary) digital data into analog signals and other signals, for example in any manner typical of an electronic device of the type of user device 1600. For example, output interface 1608 can include circuitry operative to convert digital data into analog signals for use by an external display or speaker. Any mechanism or component in output interface 1608 can be electrically coupled with control circuitry 1601, storage 1602, memory 1603, communications circuitry 1604, any other suitable components within device 1600, or any combination thereof.

Display 1609 can include any suitable mechanism for displaying visual content (e.g., images or indicators representing data). For example, display 1609 can include a thin-film transistor liquid crystal display (LCD), an organic liquid crystal display (OLCD), a plasma display, a surface-conduction electron-emitter display (SED), organic light-emitting diode display (OLED), or any other suitable type of display. Display 1609 can be electrically coupled with control circuitry 1601, storage 1602, memory 1603, any other suitable components within device 1600, or any combination thereof. Display 1609 can display images stored in device 1600 (e.g., stored in storage 1602 or memory 1603), images captured by device 1600 (e.g., captured by a camera in the device), or images received by device 1600 (e.g., images received from communications circuitry 1604). In some embodiments, display 1609 can display communication images that communications circuitry 1604 receives from other devices (e.g., other instances of device 1600). Display 1609 can be electrically coupled with control circuitry 1601, storage 1602, memory 1603, communications circuitry 1604, any other suitable components within device 1600, or any combination thereof.

Speaker 1610 can include any suitable mechanism for providing audio content. For example, speaker 1610 can include a speaker for broadcasting audio content to a general area (e.g., a room in which device 1600 is located). Speaker 1610 can be electrically coupled with control circuitry 1601, storage 1602, memory 1603, communications circuitry 1604, any other suitable components within device 1600, or any combination thereof.

In some embodiments, one or more devices can be used to control the collective generation of a sound composition. A device can be used to control any suitable aspect of collectively generating a sound composition through distributed component pieces. In some embodiments, a device can be used to assign component pieces. For example, a device can be used to manually specify what component piece or pieces to assign to other devices. In some embodiments, a device can be used to specify blending levels. For example, a device can be used to set preferences between overall audio quality and the effect of the distributed component pieces, and those preferences can then control how each device blends its assigned component piece with the overall sound composition. In some embodiments, a device can be used to specify beacon devices and their effect on sound generation. For example, a device can be used to manually specify what device or devices should be beacon devices and how the sound generation should react to those beacon devices.

In some embodiments, the one or more devices used to control collective sound generation can be standard portable devices (see, e.g., devices 121-124, devices 221-228, devices 1021-1028, devices 1221-1228 and devices 1421-1439). For example, a device that is participating in the collective sound generation can also control the collective sound generation. In some embodiments, the one or more devices used to control collective sound generation can be beacon devices (see, e.g., beacon device 1410). In some embodiments, one or more devices may have exclusive control over the collective sound generation. For example, a device that initiates a network may have exclusive control over the sound collectively generated by that network.

In accordance with the disclosure, music can be distributed in a manner that enables easy separation into component pieces for collective playback. Music can be distributed in a format that includes two or more discrete component pieces that collectively form an entire piece of music (e.g., a sound composition). For example, music data can include discrete channels, each of which can represent a component piece of a song, and an entire song can be provided by playing all of the channels in a synchronized manner. Each component piece can represent any suitable musical element.

In some embodiments, each component piece can represent an instrument of the music. For example, chamber music can be distributed in a format that includes component pieces corresponding to first violin, second violin, viola, and cello (see, e.g., FIG. 3). In another example, rock and roll music can be distributed in a format that includes component pieces corresponding to vocals, lead guitar, rhythm guitar, bass, and drums. Music in such a format can be distributed using any suitable mechanism for distributing music.

In some embodiments, music can be distributed through the internet in a format that includes discrete component pieces. For example, a portable device (see, e.g., device 1600) may be able to download music data from a server or another device in a format that includes discrete component pieces. Such a download may include a single file or multiple files. For example, a single file may include data representing each component piece or, alternatively, multiple files may be provided and each file may correspond to one or more different component pieces. In some embodiments, metadata can be used to identify component pieces in one or more files. For example, metadata associated with a file can identify the component pieces stored in the file or any other files with related component pieces (e.g., component pieces representing the same piece of music). In some embodiments, music can be distributed through the internet in a format that includes discrete component pieces after a user has bought a special version of the music (e.g., through an online store). In some embodiments, music can be distributed through the internet in a format that includes discrete component pieces as well as a traditional format (e.g., a format that includes the piece of music in left and right stereo channels).

In some embodiments, music can be distributed in a format so that each channel includes an isolated component piece. For example, each channel can include a different component piece without any portions of other component pieces. In some embodiments, each device may play a single channel when music in such a format is played back using multiple devices. However, such play back may not provide the collective music at the optimal volume or quality and each device's user may not be able to adequately hear the component pieces provided by the other devices. In some embodiments, the music channels can be mixed so that each device plays a portion of two or more component pieces. For example, music in a format with isolated component pieces can be mixed so that each device plays one or more primary component pieces along with a composite of the music (e.g., a background mix that includes all of the component pieces mixed together). Accordingly, the play back may be at an optimum total volume and each user may be able to clearly hear all component pieces, even though one or more primary component piece may be more emphasized than the others. In some embodiments, music channels can be mixed dynamically based on the content of the channels. For example, music channels may be mixed so that a device outputs the composite of the music at a relatively high volume when a primary component piece is quiet, monotonous, or otherwise uninteresting but, if the component piece become relatively important (e.g., a solo), the device can output the composite of the total song at a lower volume. Accordingly, different channels and their respective component pieces can be mixed to emphasize specific component pieces during certain periods of music. For example, different channels can be mixed to emphasize a lead guitar during a guitar solo or vocals during a musical hook. In some embodiments, different channels can be mixed based on the number of devices providing music. For example, one or more devices may provide multiple component pieces if there are not enough devices collectively providing the music. Any server or device in a network of devices can mix channels and distribute them to other devices. For example, a primary device that initiates a music performance can mix channels and distribute them to other devices that are collectively providing sound. In some embodiments, music can be distributed in a format that has already been mixed for collective performance. For example, music can be distributed in a format that includes channels with two or more component pieces that are mixed for emphasizing specific component pieces during certain periods of music. Compared to mixing music immediately before performance, each device may not need as much processing power if music is distributed in a pre-mixed format. In some embodiments, music may be pre-mixed based on an assumption of a certain number of devices that will collectively provide the music. For example, music may be pre-mixed to include four channels based on an assumption that the music will be collectively provided with four devices. In some embodiments, music that is pre-mixed for a certain number of devices may be re-mixed if the number of devices is less than the number of pre-mixed channels. For example, pre-mixed music channels may be combined if there are not enough devices for collectively providing the music. In some embodiments, music can be distributed in a format that includes a channel representing the composite song. For example, music can be distributed in a format that includes channels with individual component pieces or combinations of component pieces as well as a channel with the total song (e.g., all component pieces).

In accordance with the present disclosure, different musical elements can take on user-defined spatial relationships based on which device each channel is assigned to and where that device is located. In some embodiments, a single primary user can initiate the collective play back of music. For example, a primary user's device can query nearby devices, and those devices can prompt their respective users to determine which users are interested in collectively providing music. After identifying which users are participating, the primary user's device can transmit individual channels to each other user's device and then the primary user can provide an input to initiate the collective performance. In some embodiments, the other devices may receive and store the entire piece of music (e.g., all channels) so that their users can share the music with additional users by initiating their own collective performances at a later time. Such a method may provide an effective viral technique for sharing music. In other embodiments, the other devices may receive only the channel of the music necessary for the performance to prevent duplication. In some embodiments, the other devices may even receive a channel of the music protected by one or more components of a Digital Rights Management (DRM) system to prevent duplication.

As previously discussed, a user may be able to select a specific component piece or channel for her device to provide. For example, a user may be presented with a list of available component pieces or channels and prompted to provide an input. In some embodiments, a user may be able to provide preferences (e.g., "always lead guitar") and then a component piece or channel be automatically assigned based on the preferences.

While the previous discussion has provided examples of applying the disclosure to musical entertainment, it is understood that the disclosure can also be applied to other fields.

In some embodiments, systems and methods for collectively providing sound can be used in conjunction with traditional systems and methods for providing video. For example, systems and methods for collectively providing sounds can be used to provide sounds that correspond to video provided by traditional systems and methods. In some embodiments, systems and methods for collectively providing sounds can be used to provide sounds that help viewers understand a video provided in a foreign language. For example, a portable electronic device can provide sounds (e.g., translated audio) that assists a viewer watching a foreign-language video provided by a traditional system (e.g., a film projector, a television, or any other suitable display). As previously discussed in connection with collectively providing sound, the sound can be transmitted to portable electronic devices in any suitable manner. For example, a portable device may download all or a portion of the sound before the foreign-language video is provided. In another example, a portable device may stream all or a portion of the sound as a foreign-language video is provided.

In some embodiments, a portable device may provide sounds in conjunction with foreign-language video based on a user's stored language preferences or a user input provided at the time of the video. For example, if a user has indicated that he can understand English, the user's device may provide English sounds in conjunction with traditional video in a language other than English. Moreover, if a user has indicated that he can understand the language in which a traditional video is provided, the user's device may not provide any sounds in conjunction with the video. In an illustrative embodiment, viewers that understand the language of a traditional video can watch the video in its original language while viewers that prefer a different language may receive sounds (e.g., translated audio) through their portable devices in the preferred language (e.g., to help them understand the video). In another illustrative embodiment, two or more users' portable devices can provide sounds (e.g., translated audio) in a different language based on the preferences of each user. For example, a video may be in Spanish, one user may prefer German, another user may prefer Russian, and each user's device may provide sounds, each in conjunction with the video, to its respective user in a language based on the user's preferences. In embodiments where the sounds provided in conjunction with a foreign-language video are based on a user's preferences, each device may only download or stream the sounds designated by its user's preferences.

In some embodiments, sounds provided in conjunction with traditional video can be provided in a manner that does not distract other viewers (e.g., through individual headphones). For example, multiple audience members in a movie theater can each use a portable device to receive sounds related to a movie in a manner that does not distract the other audience members. In some embodiments, an audience member may use their own multi-function portable device (e.g., a cell phone or media player) to receive sounds related to the movie.

In some embodiments, sounds provided in conjunction with traditional video can be synchronized with the video. For example, translated audio tracks can be provided at a time that corresponds to the original audio of the video. As previously discussed in connection with collectively providing sound, any suitable technique can be used to synchronize portable devices that collectively provide sound. Moreover, a portable device or a network of portable devices can synchronize with a video provided by traditional systems or methods. In some embodiments, a portable device or a network of portable devices can communicate with a system providing foreign-language video to synchronize sounds. For example, a portable device may communicate wirelessly with a system providing a foreign-language video to synchronize sounds with the video. In some embodiments, a portable device or a network of portable devices can monitor a foreign-language video or associated audio portion and then provide sounds synchronized with the video. For example, a portable device may use a microphone to monitor the audio of a foreign-language video and then provide sounds that are synchronized with the video.

In some embodiments, sound distributed for collective playback may be provided in a manner based on nearby events or objects. A device in a known environment may provide sound based on its location in the environment (e.g., providing a particular sound when near a particular object in the environment). For example, a portable device in a museum may provide a particular sound clip when near a particular exhibit in the museum. Sounds provided based on location of a device may be collectively provided so that all devices in the same location or proximal to the same object collectively provide the corresponding sound through one or more component pieces. When a device moves to a new location, the device may then collectively provide a different sound with the other devices at the new location. In some embodiments, a device may even function as a tour guide by providing directions from one location to the next.

The various embodiments of the invention may be implemented by software, but can also be implemented in hardware or a combination of hardware and software. The invention can also be embodied as computer readable code on a computer readable medium. The computer readable medium can be any data storage device that can store data which can thereafter be read by a computer system. Examples of a computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The above described embodiments of the invention are presented for purposes of illustration and not of limitation. It is understood that one or more features of an embodiment can be combined with one or more features of another embodiment to provide systems and/or methods without deviating from the spirit and scope of the invention.

What is claimed is:

1. A method for collectively generating a sound composition that includes multiple component pieces, the method comprising:

receiving a user input via a first device in a network, wherein a first component piece is played on the first device;

determining, using the network, at least one factor associated with a second device in the network;

assigning a second component piece to the second device based on the at least one factor, wherein the network assigns the second component piece;

transmitting data to the second device; and generating the sound composition using at least the first and second devices, wherein the second device generates a blend of at least the first component piece and the second component piece.

2. The method of claim 1, wherein the user input specifies the second device.

3. The method of claim 1, wherein the user input specifies the first component piece assigned to the first device.

4. The method of claim 1, wherein the transmitting data comprises transmitting, in accordance with a MIDI protocol, data representing the first component piece.

5. The method of claim 1, wherein the blend is based at least partially on the number of devices collectively generating sound.

6. The method of claim 1, wherein the blend is based at least partially on the output of a microphone in the second device.

7. The method of claim 1, wherein the blend is based at least partially on the importance of the second component piece assigned to the second device.

8. The method of claim 1, wherein the user input generates the network.

9. The method of claim 1, wherein the first component piece comprises multiple component pieces, the multiple component pieces being assigned to the first device.

10. The method of claim 1, wherein the at least one factor comprises location.

11. The method of claim 1, wherein the at least one factor comprises an orientation of the second device.

12. The method of claim 1, wherein the first component piece and the second component piece are substantially similar.

13. The method of claim 1, wherein the blend comprises a blend of the first component piece, the second component piece, and the sound composition.

14. The method of claim 1, wherein the second component piece comprises multiple component pieces, the multiple component pieces being assigned to the second device.

* * * * *